United States Patent
Chitrakar et al.

(10) Patent No.: US 11,659,489 B2
(45) Date of Patent: May 23, 2023

(54) COMMUNICATION APPARATUS AND COMMUNICATION METHOD FOR LOW POWER MULTI-USER TRANSMISSION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 77 days.

(21) Appl. No.: 16/958,078

(22) PCT Filed: Jan. 9, 2019

(86) PCT No.: PCT/JP2019/000282
§ 371 (c)(1),
(2) Date: Jun. 25, 2020

(87) PCT Pub. No.: WO2019/139019
PCT Pub. Date: Jul. 18, 2019

(65) Prior Publication Data
US 2020/0322889 A1    Oct. 8, 2020

Related U.S. Application Data

(60) Provisional application No. 62/616,274, filed on Jan. 11, 2018.

(30) Foreign Application Priority Data

Apr. 25, 2018    (JP) .............................. JP2018-084417

(51) Int. Cl.
H04W 52/02    (2009.01)
H04W 72/04    (2023.01)

(52) U.S. Cl.
CPC ....... *H04W 52/0235* (2013.01); *H04W 72/04* (2013.01)

(58) Field of Classification Search
CPC .......................... H04W 52/0235; H04W 72/04
(Continued)

(56) References Cited

U.S. PATENT DOCUMENTS

2014/0051476 A1    2/2014   Chawla et al.
2014/0211678 A1    7/2014   Jafarian et al.
(Continued)

FOREIGN PATENT DOCUMENTS

WO    WO-2018106006 A1 *    6/2018    ............ H04W 28/06

OTHER PUBLICATIONS

U.S. Appl. No. 62/461,583, filed Feb. 21, 2017.*
(Continued)

*Primary Examiner* — Faisal Choudhury
(74) *Attorney, Agent, or Firm* — Seed IP Law Group LLP

(57) ABSTRACT

The present disclosure provides a communication apparatus that comprises a Primary Connectivity Radio (PCR) capable of transmitting and receiving wireless signals; a low power Wake Up Receiver (WURx) capable of receiving Wake-Up Radio (WUR) signals, the WURx being configured to receive WUR signals on a first WUR channel assigned to the apparatus by an Access Point (AP); a WUR channel scheduler programmed to configure the WURx to switch to a second WUR channel designated as a broadcast WUR channel by the AP, when the first WUR channel is different from the second WUR channel, wherein the channel switch occurs in time for the WURx to receive the scheduled WUR Beacon frames from the AP.

18 Claims, 28 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2016/0381638 A1 | 12/2016 | Min et al. | |
| 2019/0230581 A1* | 7/2019 | Hwang | H04W 52/0225 |
| 2019/0289549 A1* | 9/2019 | Lim | H04W 52/0219 |
| 2020/0053648 A1* | 2/2020 | Guo | H04W 52/28 |
| 2020/0059861 A1* | 2/2020 | Huang | H04W 52/0229 |
| 2020/0059863 A1* | 2/2020 | Ji | H04W 52/0216 |
| 2020/0359320 A1* | 11/2020 | Chun | H04W 52/52 |

OTHER PUBLICATIONS

Huang, "Specification Framework for TGba," IEEE 802.11-17/0575r8, *Intel*, Dec. 21, 2017, 13 pages.

Hwang et al., "WUP CCA Problem," IEEE 802.11-17/1426r1, *Yonsei University*, Sep. 13, 2017, 12 pages.

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications," Approved Dec. 7, 2016, 3,534 pages.

International Search Report, dated Apr. 2, 2019, for corresponding International Application No. PCT/JP2019/000282, 2 pages.

Kim et al., "WUR channel issue," IEEE 802.11-17/1651r2, *LG Electronics*, Nov. 6, 2017, 16 pages.

Liu et al., "Efficient FDMA MU Transmission Schemes for WUR WLAN," IEEE 802.11-17/1625r1, *Mediatek*, Oct. 10, 2017, 7 pages.

Indian Office Action, dated Mar. 28, 2022, for Indian Application No. 202027026730. (6 pages).

* cited by examiner

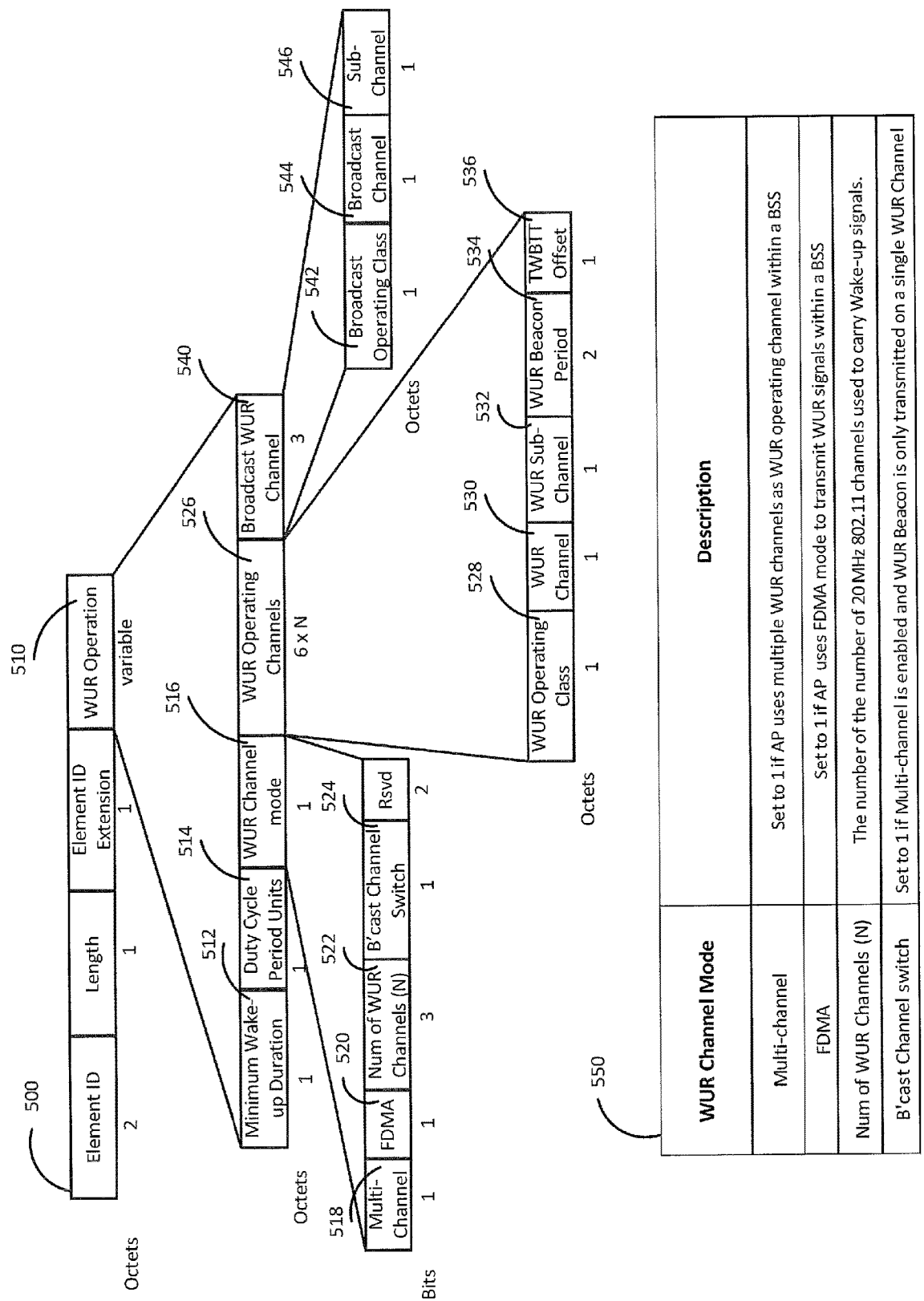

COMMUNICATION APPARATUS AND COMMUNICATION METHOD FOR LOW POWER MULTI-USER TRANSMISSION

TECHNICAL FIELD

The present disclosure is generally related to a communication apparatus and a communication method.

BACKGROUND ART

The IEEE (Institute of Electrical and Electronics Engineers) 802.11ba Taskgroup is currently in the process of standardizing wireless communication technologies related to the operations of a wake-up radio (WUR) apparatus. The WUR apparatus is a companion radio apparatus to the primary connectivity radio (PCR) apparatus and coexists with legacy IEEE 802.11 devices in the same or different frequency band. The PCR may be any of the existing mainstream IEEE 802.11 amendments (802.11a, 802.11g, 802.11n or 802.11ac) or even other applicable future amendments (e.g. 802.11ax). The purpose of the WUR apparatus is to trigger the transition of the PCR apparatus out of sleep upon reception of a valid wake-up packet, while the PCR is used as the primary wireless communication radio. The PCR apparatus is only turned on during active communication, while during period of idle listening, the PCR apparatus is turned off and only the WUR apparatus is operating. The WUR apparatus is expected to have active receiver power consumption less than one milliwatt, which is much lesser compared to the active receiver power consumption of the PCR apparatus. Devices with a WUR apparatus may be called WUR devices and WUR mode may refer to operation mode where only the WUR is in operation while the PCR is turned off. The 802.11ba Taskgroup is currently investigating WUR transmissions on multiple channels and Frequency Division Multiple Access (FDMA) technology to further improve the efficiency of the WUR transmission.

The IEEE 802.11ba amendment is primarily targeted at applications and Internet-of-Things (IOT) use cases in which the communication devices are usually powered by a battery and it is highly desirable to extend the battery lifetime while maintaining reasonably low latency. When large number of IOT devices need to be serviced by a single Access Point (AP), WUR transmissions on multiple channels and FDMA transmission may help to significantly improve the ability to quickly wake up multiple devices by making more efficient use of the available frequency resources.

CITATION LIST

Non Patent Literature

[NPL 1]
IEEE Std 802.11-2016
[NPL 2]
IEEE 802.11-17/0575r8, Specification Framework for TGba, November 2017
[NPL 3]
IEEE 802.11-17/001651r2, WUR Channel issue
[NPL 4]
IEEE 802.11-17/1625r1, Efficient FDMA Transmission Schemes for WUR WLAN
[NPL 5]
IEEE 802.11-17/1426r1, WUP CCA Problem

SUMMARY OF INVENTION

WUR transmissions on multiple channels and FDMA WUR transmission are effective methods to improve the transmission efficiency of WUR signals. However, WUR transmissions on multiple channels as well as FDMA WUR transmission introduces a range of issues that need to be addressed for its' practical implementation.

One non-limiting and exemplary embodiment of the present disclosure provides means for practical implementation of WUR transmissions on multiple channels as well as FDMA transmission of WUR signals.

In one general aspect, the techniques disclosed here features: a communication apparatus, comprising: Primary Connectivity Radio (PCR) circuitry which, in operation, receives, from an Access Point (AP), a WUR operation element that indicates a first WUR channel used by the AP for transmission of WUR Beacon frames; and further receives a WUR Mode element that indicates a second WUR channel used by the AP for transmission of WUR Wake-up frames to the apparatus; and Wake Up Receiver (WURx) circuitry which, in operation, listen for WUR Wake-up frames on the second WUR channel; and a controller which, in operation, switches the WURx from the second WUR channel to the first WUR channel in time to receive, from the AP, a WUR beacon frame at TWBTT (target WUR beacon transmission time).

It should be noted that general or specific embodiments may be implemented as a system, a method, an integrated circuit, a computer program, a storage medium, or any selective combination thereof.

The communication apparatus and communication method described in the present disclosure provides the means for practical implementation of WUR transmissions on multiple channels and the FDMA transmission of WUR signals.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 5A shows the WUR Operation element used by the AP to advertise the various parameters in use for the operation of the wireless network as per a first embodiment.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

Figure 1:
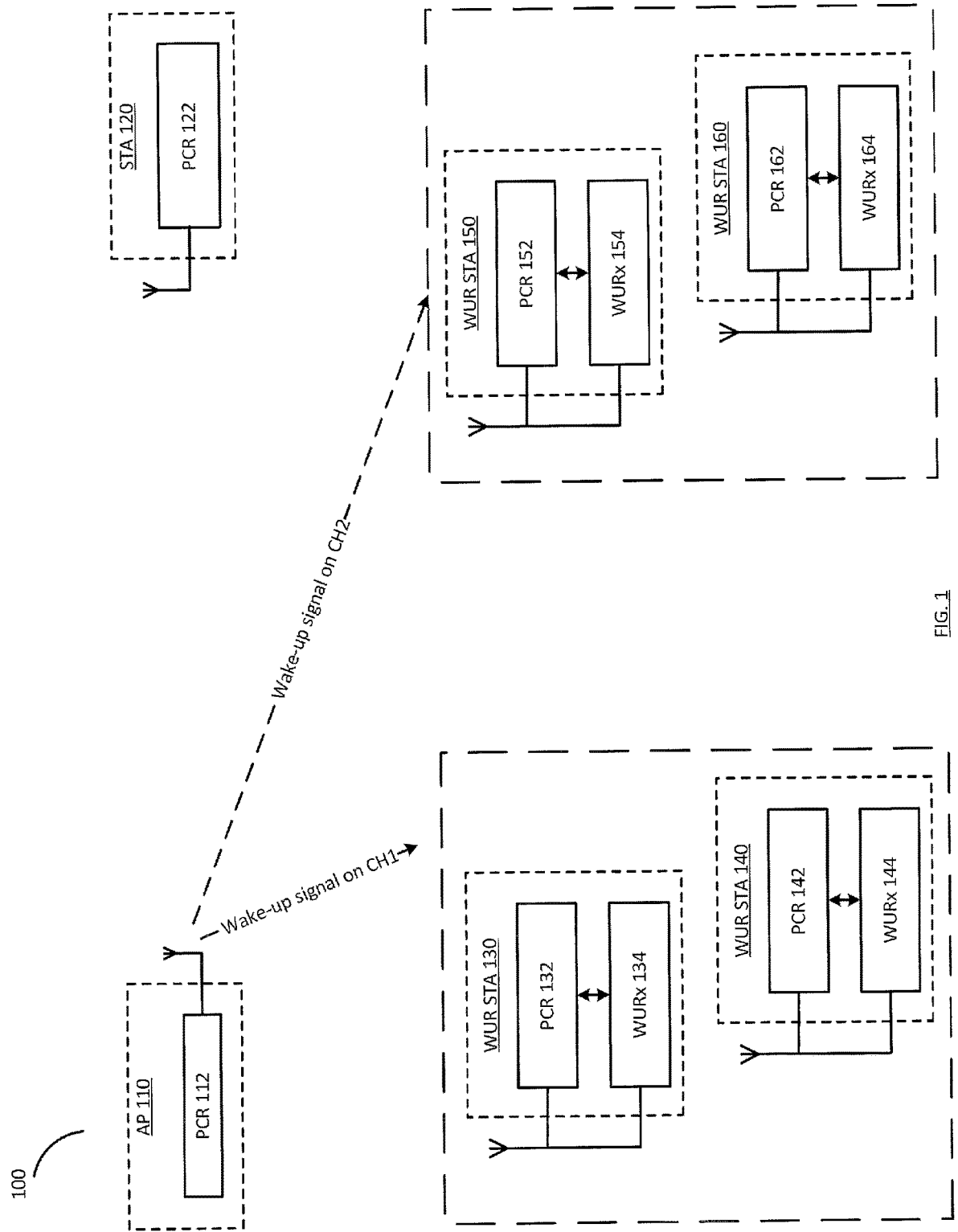
FIG. 1 shows an example heterogeneous 802.11 wireless network with a mixture of legacy 802.11 devices and WUR capable devices.

FIG. 1 shows an example of a wireless communication network 100 in which the present disclosure may be applied. The wireless communication may be based on popular wireless standards such as IEEE 802.11. The wireless communication network 100 may comprise an Access Point (AP) 110 and five stations (STA) 120, 130,140, 150 and 160. Although in 802.11 terminologies, STA may refer to both AP as well as non-AP devices, however in this disclosure STA only refers to non-AP devices. The AP 110 is equipped with a Primary Connectivity Radio (PCR) apparatus (hereinafter stated simply as "PCR") 112 which is capable of transmitting and receiving wireless signals in the 802.11 waveform (e.g. Orthogonal Frequency Division Multiplexing (OFDM)) as well as being capable of transmitting wireless signals in the Wake-up radio (WUR) waveform (e.g. On-Off Keying (OOK)). STA 120 is a legacy 802.11 device that is only equipped with a PCR 122 capable of transmitting and receiving 802.11 signals whereas STAs 130, 140, 150 and 160 are WUR capable STAs and are equipped with PCRs 132, 142, 152 and 162 respectively as well as Wake-up radio receivers (WURx) apparatus (hereinafter stated simply as "WURx") 134, 144, 154 and 164 respectively. STAs 130, 140, 150 and 160 are capable of transmitting and receiving 802.11 signals and are also capable of receiving WUR signals. The PCRs 132, 142, 152 and 162 may only be turned on during active communication (PCR mode), while during period of idle listening, the PCRs may be turned off and only the WURx 134, 144, 154 and 164 may be operating (WUR mode). If the STAs are already associated with the AP 100, when the AP 110 needs to communicate with STAs operating in WUR mode, it may first transmit wake-up signal to instruct the STAs to transit to PCR mode by turning on the respective PCRs and switching off the WURx. Subsequently the AP and the STAs may perform communication over the PCR. Once the communication is over, the STAs may switch back to WUR mode by switching off the PCR and turning on the WURx. The wireless channel on which the AP110 transmits Wake-up signals to the WURx of the WUR STAs may be called WUR channels. Although a single WUR channel may be used to transmit Wake-up signals to all the WUR STAs, in order to make the transmission of Wake-up signals more efficient, the AP 110 may also assign different WUR channels to the WUR STAs. For example WUR STAs 130 and 140 are assigned to WUR channel CH1 while WUR STAs 150 and 160 are assigned to WUR channel CH2.

Figure 2:
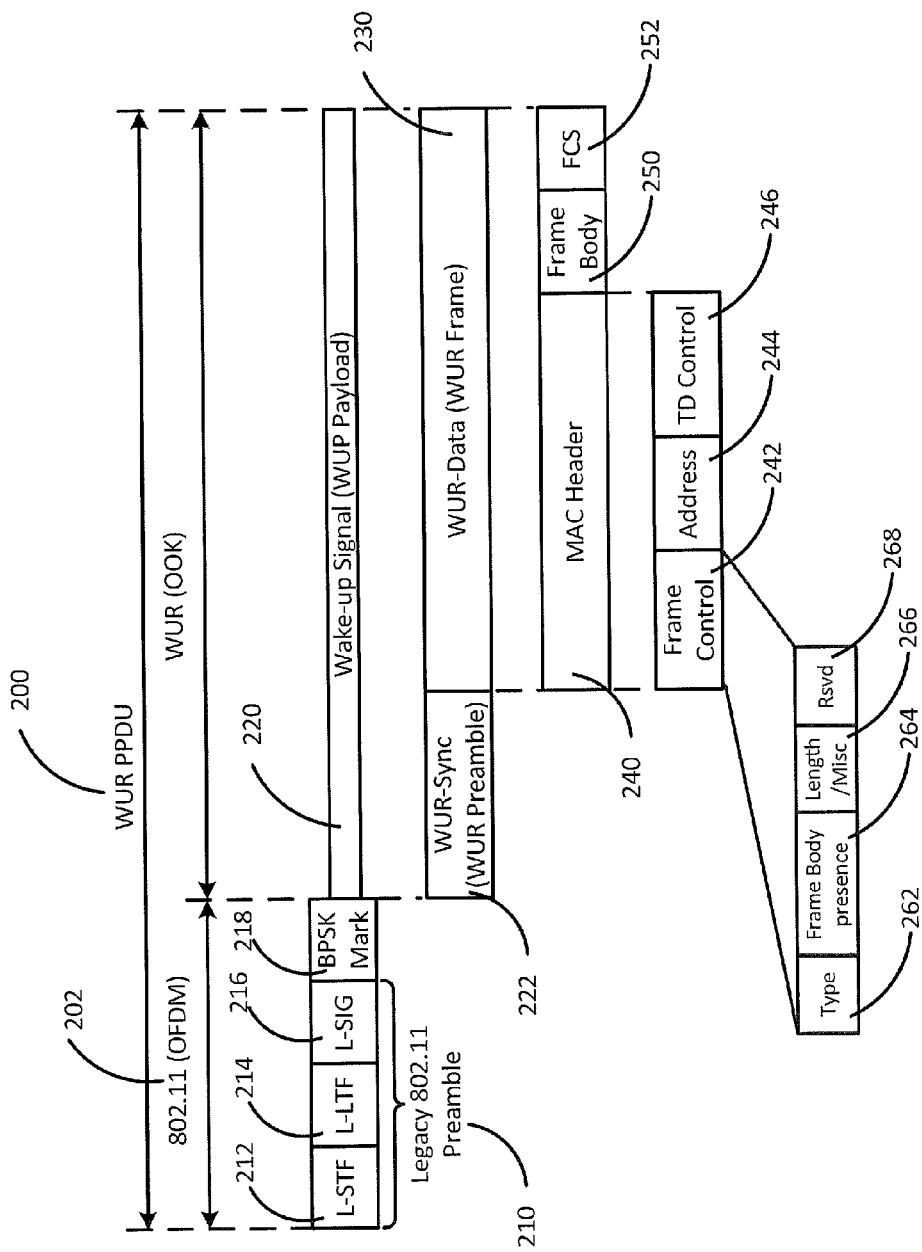
FIG. 2 shows the format of WUR PHY Protocol Data Unit (PPDU) being considered in the 802.11ba Taskgroup.

FIG. 2 shows the format of the wake-up signal being considered in the IEEE 802.11ba Taskgroup. The wake-up signal may be represented as the WUR PHY Protocol Data Unit (PPDU) 200. The WUR PPDU 200 is composed of two distinct portions. The first portion is comprised of a 20 MHz legacy (also known as non-high-throughput (HT)) 802.11 preamble 210 and one extra OFDM symbol 218 called BPSK Mark, which are transmitted in the 802.11 OFDM waveform over the entire 20 MHz channel. The second portion is the wake-up signal 220 which may also be referred to as wake-up packet (WUP) payload and is transmitted in a WUR OOK waveform in a narrower sub-channel within the 20 MHz channel, for example a 4 MHz sub-channel. Although only a single WUP Payload 220 is shown in FIG. 2, it is also possible that more than one, for example three WUP Payloads, are transmitted on different, non-overlapping sub-channels within the 20 MHz channel.

The legacy 802.11 preamble 210 provides coexistence with legacy 802.11 devices that do not understand the WUR signals. Preamble 210 further comprises a non-HT Short Training Field (L-STF) 212, a non-HT Long Training Field (L-LTF) 214 and a non-HT SIGNAL field (L-SIG) 216. The L-SIG 216 carries information regarding the length of the WUP payload 220, allowing legacy 802.11 devices to defer their transmissions for the correct duration. The BPSK Mark 218 of duration 4 micro-seconds modulated in Binary Phase Shift Keying (BPSK) is transmitted right after the L-SIG 216 to prevent 802.11n devices from wrongly decoding the WUR PPDU 200 as being an 802.11n packet.

The WUP Payload 220 carries the actual wake-up signal and comprises a WUR preamble 222 and a WUR frame 230. The WUR preamble 222 may also be referred to as WUR-Sync while the WUR frame 230 may also be referred to as WUR-Data. The WUR preamble 222 is used for automatic gain control (AGC), timing synchronization, packet detection etc., while the WUR frame 230 carries the control information. The WUR frame 230 may be further composed of various sub-fields such as a MAC header 240, a Frame check sequence (FCS) 252 as well as the optional Frame body 250. The MAC header 240 may be further comprised of a Frame control field 242 that species the frame Type 262, a Frame Body presence bit 264, a Length/Misc. field 266 etc., an Address field 244 that may carry either one of the Transmitter Address, Receiver address or both, and a TD Control field 246. The TD Control field 246 may be used to carry different control information depending on the frame Type. For example in WUR beacon frames, the TD Control field 246 may carry a timestamp field, while in unicast WUR frames, the TD Control field 246 may carry a packet number etc. The WUR frame 230 may be transmitted using either low data rate (LDR) of 62.5 kb/s or high data rate (HDR) of 250 kb/s. The data rate used for the WUR frame 230 is indicated by pre-defined sequences in the WUR-Sync field 222. Manchester-based code is applied to both WUR data rates and Multicarrier On-Off Keying (MC-OOK) is used for modulation of both WUR data rates.

Figure 3:
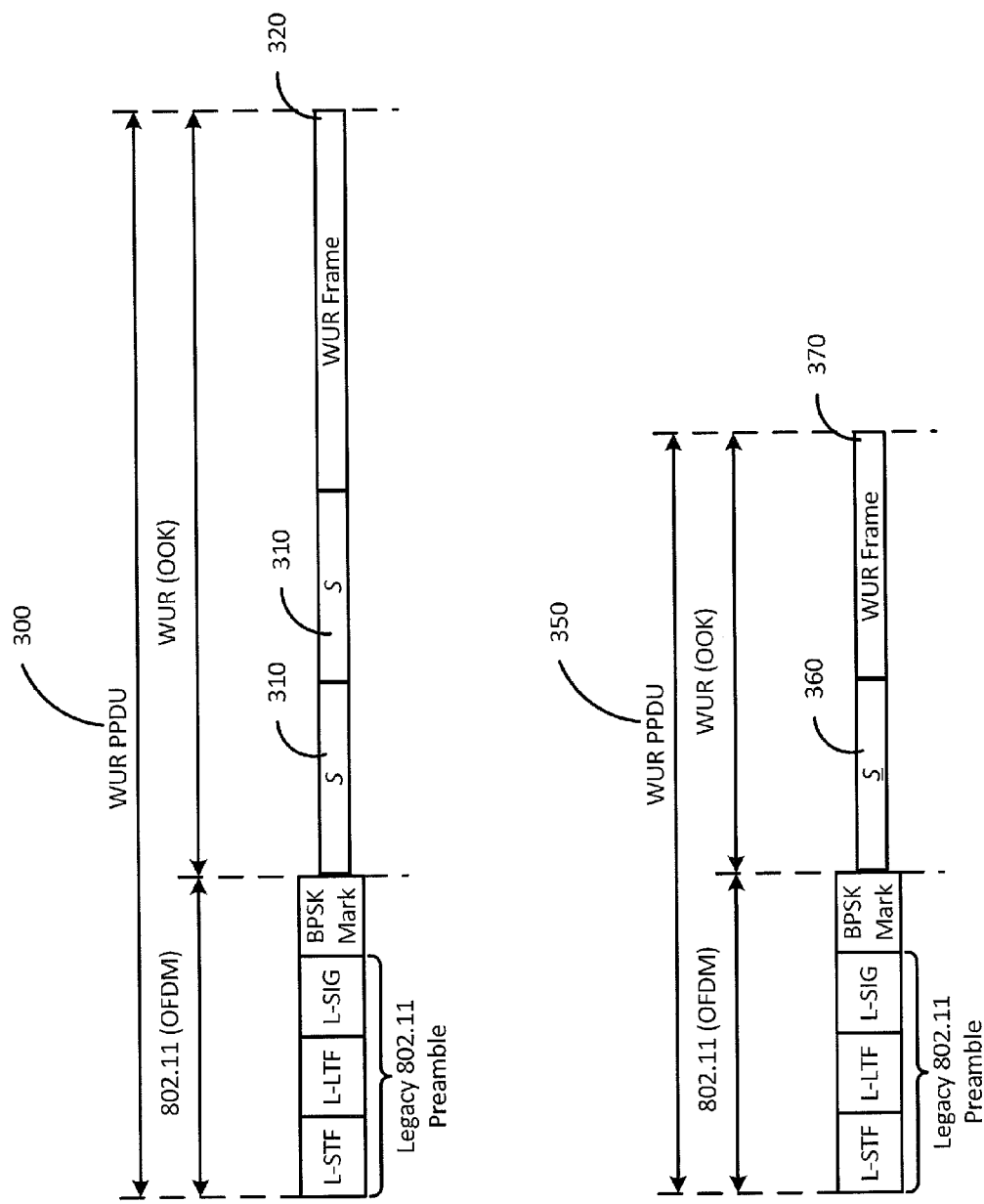
FIG. 3 shows the formats of the low data rate WUR PPDU and the high data rate WUR PPDU.

FIG. 3 shows the format of the WUR PPDUs for the low data rate and high data rate. WUR PPDU 300 carries the WUR frame 320 that is transmitted using the low data rate. For low data rate, the WUR-Sync field 222 is constructed by concatenating two copies of the 32-bit sequence S 310. WUR PPDU 350 carries the WUR frame 370 that is transmitted using the high data rate. For high data rate, the WUR-Sync field 222 is made up of the 32-bit sequence $\underline{S}$ 360, which is the bit-wise complement of the 32-bit sequence S 310. As an example S 310 may be (1 0 1 0 0 1 0 0 1 0 1 1 1 0 1 1 0 0 0 1 0 1 1 1 0 0 1 1 1 0 0 0) while $\underline{S}$ 360 may be (0 1 0 1 1 0 1 1 0 1 0 0 0 1 0 0 1 1 1 0 1 0 0 0 1 1 0 0 0 1 1 1).

Figure 4:
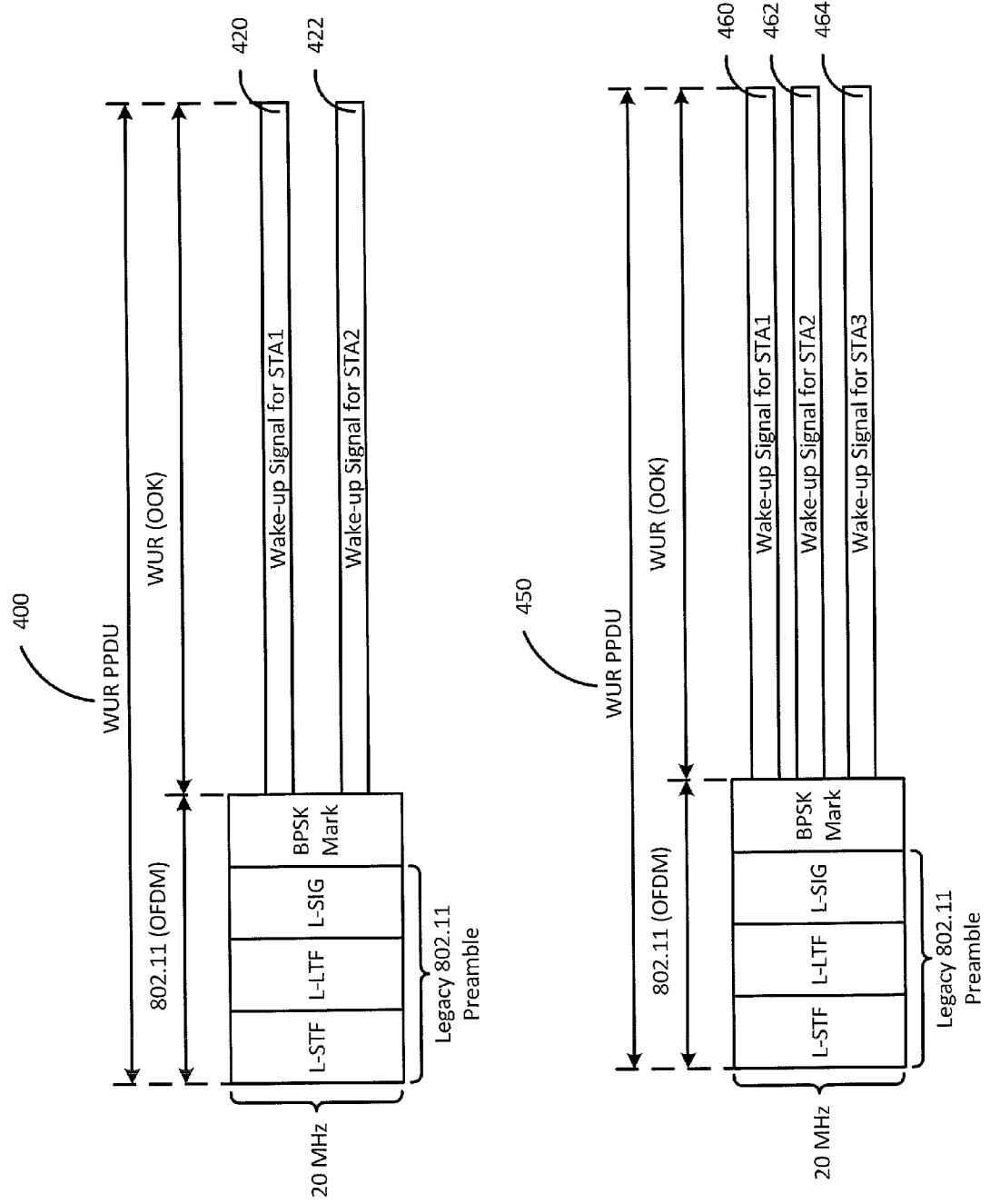
FIG. 4 shows a possible WUR FDMA transmission scheme.

As shown in FIG. 1, it is possible that more than one WUR channel may be defined in a wireless network to improve the transmission efficiency of Wake-up signals. When multiple WUR channels are available for transmission of Wake-up signals, Frequency Division Multiple Access (FDMA) may be utilized for efficient transmission of Wake-up signals. In FIG. 2, it is shown that the WUR PPDU 200 carries a single Wake-up signal 220 within a 20 MHz channel. However, it is also possible that multiple Wake-up signals may be carried within a single 20 MHz channel. This may be achieved by defining two or three non-overlapping 4 MHz sub-channels within a 20 MHz channel. Each sub-channel may be used to carry Wake-up signals and functions as an independent WUR channel. In FIG. 4, WUR PPDU 400 is an example of a WUR PPDU that simultaneously carries two Wake-up signals within a 20 MHz channel by using FDMA WUR transmission scheme. Wake-up signal 420 may be addressed for WUR STA1 while Wake-up signal 422 may be addressed for WUR STA2. Similarly, WUR PPDU 450 is an example of a WUR PPDU that simultaneously carries three Wake-up signals within a 20 MHz channel by using FDMA WUR transmission scheme. Wake-up signal 460 may be addressed for WUR STA1, Wake-up signal 462 may be addressed for WUR STA2 while Wake-up signal 464 may be addressed for WUR STA3. The OFDM portion of the WUR PPDU is still transmitted over the whole 20 MHz and is common for all the Wake-up signals.

Several exemplary embodiments are described in detail in later sections to describe the disclosure in detail. The various embodiments for reducing the scan latency as per the present disclosure are described in detail in the following sections.

First Embodiment

As mentioned earlier, although a single WUR Operating channel (or simply WUR Channel) could be used to transmit Wake-up signals to all the WUR STAs in a BSS, in order to make the transmission of Wake-up signals more efficient, multiple WUR channels may be defined for use within the same BSS. The AP may divide the WUR STAs in different groups based on the WUR STAs' characteristics, and assign different WUR channels to different groups of WUR STAs. Such WUR operation in which multiple WUR channels are defined for use within a single BSS may be known as multi-channel WUR operation. Multi-channel WUR operation may be implemented using various methods of defining WUR channels. One method involves dividing a 20 MHz 802.11 channel into multiple narrow sub-channels as shown in FIG. 4. From the WUR STA's perspective, since each WUR STA's WURx may be set to only listen on a particular sub-channel, each sub-channel within a 20 MHz 802.11 channel acts as independent WUR channel and may be used to carry Wake-up signals for different WUR STAs. Since a single 20 MHz 802.11 channel is used, such Multi-channel WUR Operation may be known as Narrow band Multi-channel WUR Operation.

Further, in a Narrow band Multi-channel WUR Operation, by utilizing FDMA transmission scheme, multiple Wake-up signals may be transmitted simultaneously on the same 20 MHz 802.11 channel. Since a single 20 MHz 802.11 channel is used, such transmission scheme may be known as Narrow band FDMA WUR transmission scheme. Whether an AP uses a single WUR channel or multiple WUR channels within a BSS may affect a WUR STAs' operation. For example, broadcast WUR frames may be transmitted differently depending on whether a single WUR channel or multiple WUR channels are in use in a BSS. Similarly whether the Wake-up Signals are transmitted using FDMA or not may have some impact on the settings used for the reception of the Wake-up signals by the WUR STAs. For example, when the sub-channels within 20 MHz are used as WUR channels, a receiving WUR STA may need to use higher order filter in order to minimize the interference from Wake-up signals on adjacent sub-channels. FIG. 5A shows the WUR Operation element 500 that an AP may include in the Beacon frame or Probe Response frames etc. to advertise such information. The WUR operation field 510 carries the various parameters used by the AP for WUR operation within its BSS. The Minimum Wake-up Duration field 512 indicates the minimum duration that a WUR STA in duty cycle operation must remain in WURx awake state. The Duty Cycle Period Units field 514 indicates the basic unit of the period of the WUR duty cycle operation. The WUR Channel mode field 516 and the WUR Operating Channels field 526 together indicate the parameters related to the WUR Channels that are used within the BSS. The meaning of the sub-fields of the WUR Channel mode field 516 is summarized in table 550. The Multi-channel bit 518 is set to 1 if multiple WUR channels are defined for use within the same BSS and set to 0 if only a single WUR channel is used. The FDMA bit 520 is set to 1 if FDMA scheme is used for transmission of Wake-up signals. When the Multi-channel bit 518 is set to 1, the Num of WUR Channels field 522 indicates N, the number of 20 MHz 802.11 channels used to carry Wake-up signals in the BSS. When Narrow band FDMA WUR transmission scheme is used, N is equal to one. The B'cast Channel Switch bit 524 is set to 1 to indicate that WUR Beacon frames is only transmitted on a single WUR Channel and WUR STAs are expected to perform channel switch to receive broadcast WUR PPDUs. The WUR Operating Channels field 526 carries a set of parameters related to the WUR channels defined in the BSS, one set per each 20 MHz 802.11 channel used to carry Wake-up signals. When Narrow band FDMA WUR transmission scheme is used, since only one 20 MHz 802.11 channel is used to carry Wake-up signals, only one set is included. The WUR Operating Class field 528 indicates the operating class used for the transmission of Wake-up signals, while the WUR Channel field 530 indicates the 20 MHz 802.11 channel used to carry Wake-up signals. The WUR Sub-channel field 532 is only present when Narrow band Multi-channel WUR Operation is used by the AP and indicates the number of sub-channels defined to carry Wake-up signals within the 20 MHz 802.11 channel indicated by the WUR Channel field 530. The WUR Beacon Period field 534 indicates the period of the WUR Beacon frame transmitted on the 20 MHz 802.11 channel indicated by the WUR Channel field 530. The TWBTT Offset field 536 indicate the offset, in microsecond, between the transmission time of the PCR Beacon frame and the WUR Beacon frame transmitted on the 20 MHz 802.11 channel indicated by the WUR Channel field 530. The Broadcast WUR Channel field 540 is an optional field that is only present when the B'cast Channel Switch bit 524 is set to 1, and indicates the WUR channel used to transmit broadcast WUR PPDUs. The WUR channel used to transmit broadcast WUR PPDUs may also be referred to as the Base WUR channel or the Primary WUR channel of the BSS.

Figure 5B:
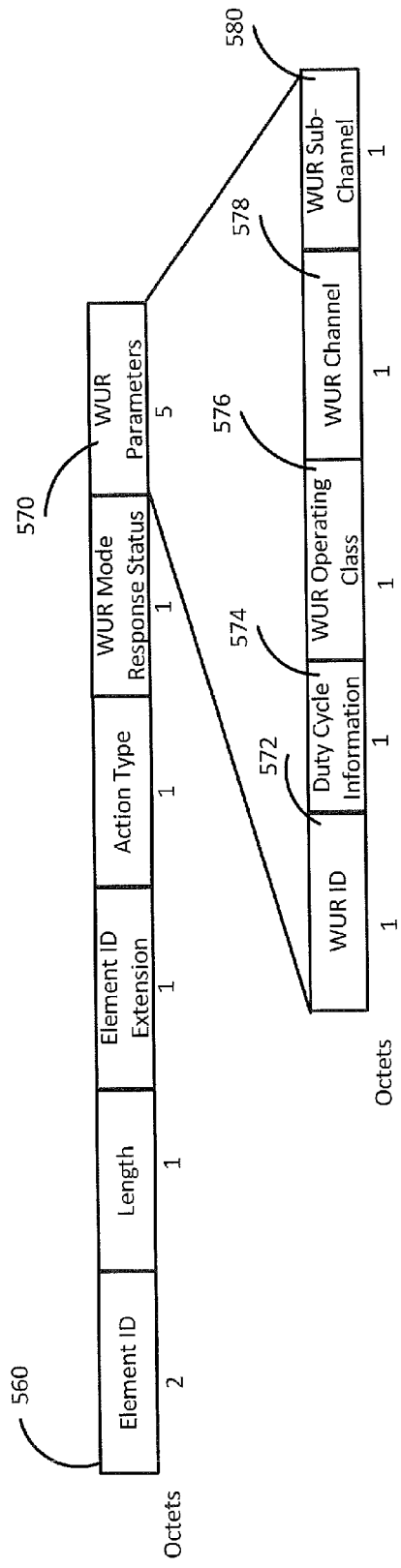
FIG. 5B shows the WUR Mode element used to negotiate the parameters related to WUR operation between the AP and associated WUR STAs as per the first embodiment.

FIG. 5B shows the WUR Mode element 560 used to negotiate the parameters related to WUR operation between the AP and associated WUR STAs. A WUR STA uses the WUR Mode element 560 to request setup of WUR operation with the AP and to negotiate the parameters related to WUR operation such as preferred On Duration, desired Duty cycle period etc. If the AP approves the request to setup WUR operation, the AP uses the WUR Parameters field 570 within the WUR Mode element 560 to inform the WUR operation parameters specific to the WUR STA. The WUR ID field 572 indicates the WUR Identifier that uniquely identifies the WUR STA within the BSS. The Duty cycle information field 574 indicates the parameters related to the WUR STA's duty cycle mode. When multiple WUR channels are used within a BSS, different WUR STAs may be assigned to different WUR channels. The WUR Operating Class field 576 indicates the operating class used for the transmission of Wake-up signals addressed to the WUR STA, while the WUR Channel field 578 indicates the 20 MHz 802.11 channel used to carry the Wake-up signals addressed to the WUR STA. The WUR Sub-channel field 580 is only present when Narrow band Multi-channel WUR Operation is used by the AP and indicates the index of the sub-channel within the 20 MHz 802.11 channel assigned to the WUR STA. For example when two sub-channels are defined as shown in WUR PPDU 400 in FIG. 4, 0 indicates the top sub-channel that carries the wake-up signal 420 while 1 indicates the bottom sub-channel that carries the Wake-up signal 422. Similarly, when three sub-channels are defined as shown in WUR PPDU 450 in FIG. 4, 0 indicates the top sub-channel that carries the Wake-up signal 460, 1 indicates center sub-channel that carries the Wake-up signal 462 and 2 indicates the bottom sub-channel that carries the wake-up signal 464.

Figure 6:
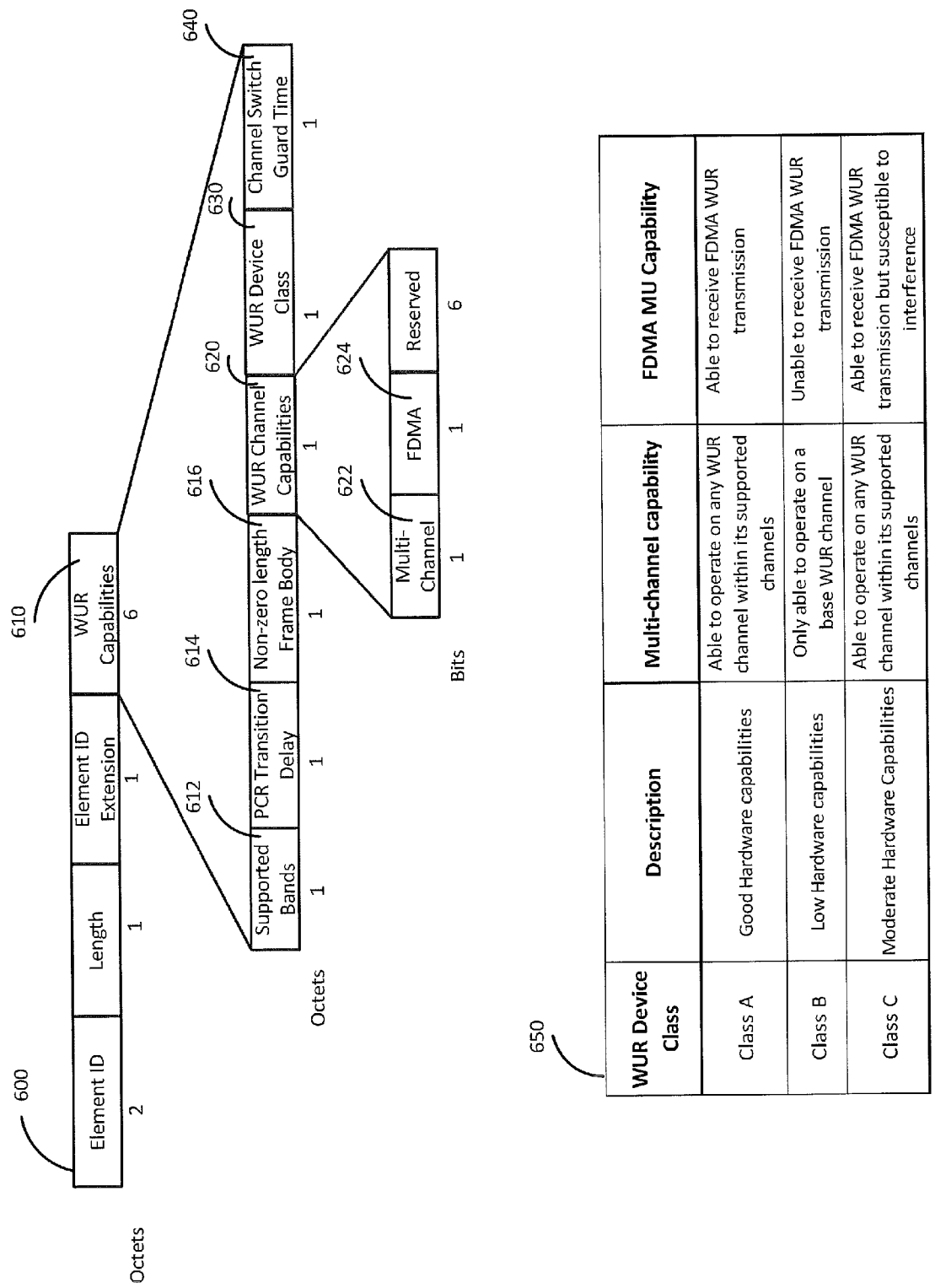
FIG. 6 shows the WUR capabilities element used to indicate the various capabilities of the WUR AP and WUR STAs as per the first embodiment.

FIG. 6 shows the WUR capabilities element 600 used to indicate WUR related capabilities. The WUR Capabilities field 610 carries the various parameters related to WUR capabilities and some of the fields may be only valid for AP or WUR STA. The Supported Bands field 612 indicates the bands supported by a WUR STA for the WUR operating channel while the field is reserved for AP. The PCR Transition Delay field 614 indicates the PCR transition delay from doze state to awake state of a WUR STA after the WUR STA receives wake-up frame while the field is reserved for AP. The Nonzero Length Frame Body field 616 indicates whether non-zero length frame body is supported by a WUR STA while the field is reserved for AP. The WUR Channel capabilities field 620 indicates the capabilities related to WUR Channels. The Multi-channel bit 622 indicates whether the AP or WUR STA supports the multi-channel WUR operation. Similarly, the FDMA bit 624 indicates whether the AP or WUR STA supports the FDMA WUR transmission scheme. If a WUR STA does not support the multi-channel WUR operation, it may only be able to receive Wake-up signals on a default WUR channel, for example the Wake-up signal 462 on the center sub-channel in FIG. 4. In such case, the AP can only assign the center sub-channel to such WUR STAs. Similarly, a WUR STA may not support FDMA WUR transmission due to low complexity receiver filter design etc. and in such cases, the AP needs to use non-FDMA WUR transmissions for such WUR STA. Such information may be useful to an AP to decide whether or not to allow such WUR STA to enter the WUR mode operation within its BSS. The WUR Device class field 630 is reserved for AP, while for WUR STAs it indicates the STAs' hardware capabilities as listed in table 650. Class A WUR devices have good hardware capabilities and are able to operate on any WUR channel within its supported channels. If required, Class A WUR STAs are capable of performing channel switch to receive broadcast WUR transmissions. Class B devices have low hardware capabilities and are only able to operate on the Base (Broadcast) WUR channel. Class B devices may not be able to receive Narrow band FDMA WUR transmissions due to poor receive filter capabilities. Class C devices have moderate hardware capabilities and are able to operate on any WUR channel within its supported channels. If required, Class C WUR STAs are also capable of performing channel switch to receive broadcast WUR transmissions. Class C devices may be capable of receiving Narrow band FDMA WUR transmissions; however they may be susceptible to interference from WUR transmissions on adjacent WUR channels. An AP may make use of the knowledge of a WUR STA's device class to intelligently assign WUR channels in the BSS, for example all Class B and Class C devices may be assigned to the Broadcast WUR channel while Class A devices may be assigned to any WUR channel. Similarly FDMA WUR transmission may be used to transmit Wake-up signals to Class A and Class C devices but only non-FDMA WUR transmissions may be used for Class B devices. The Channel Switch Guard Time field 640 is reserved for AP while it is an optional field for WUR STAs and is only present when a WUR STA is negotiating WUR mode setup with an AP that has set the B'cast Channel Switch bit 524 in its WUR Operation element 500 in FIG. 5A to 5B. The Channel Switch Guard Time field 640 indicates the maximum time period that a WUR STA would be unavailable to receive WUR frames on its assigned WUR channel due to the WUR STA's WURx switching channel to the Broadcast WUR channel.

Figure 7:
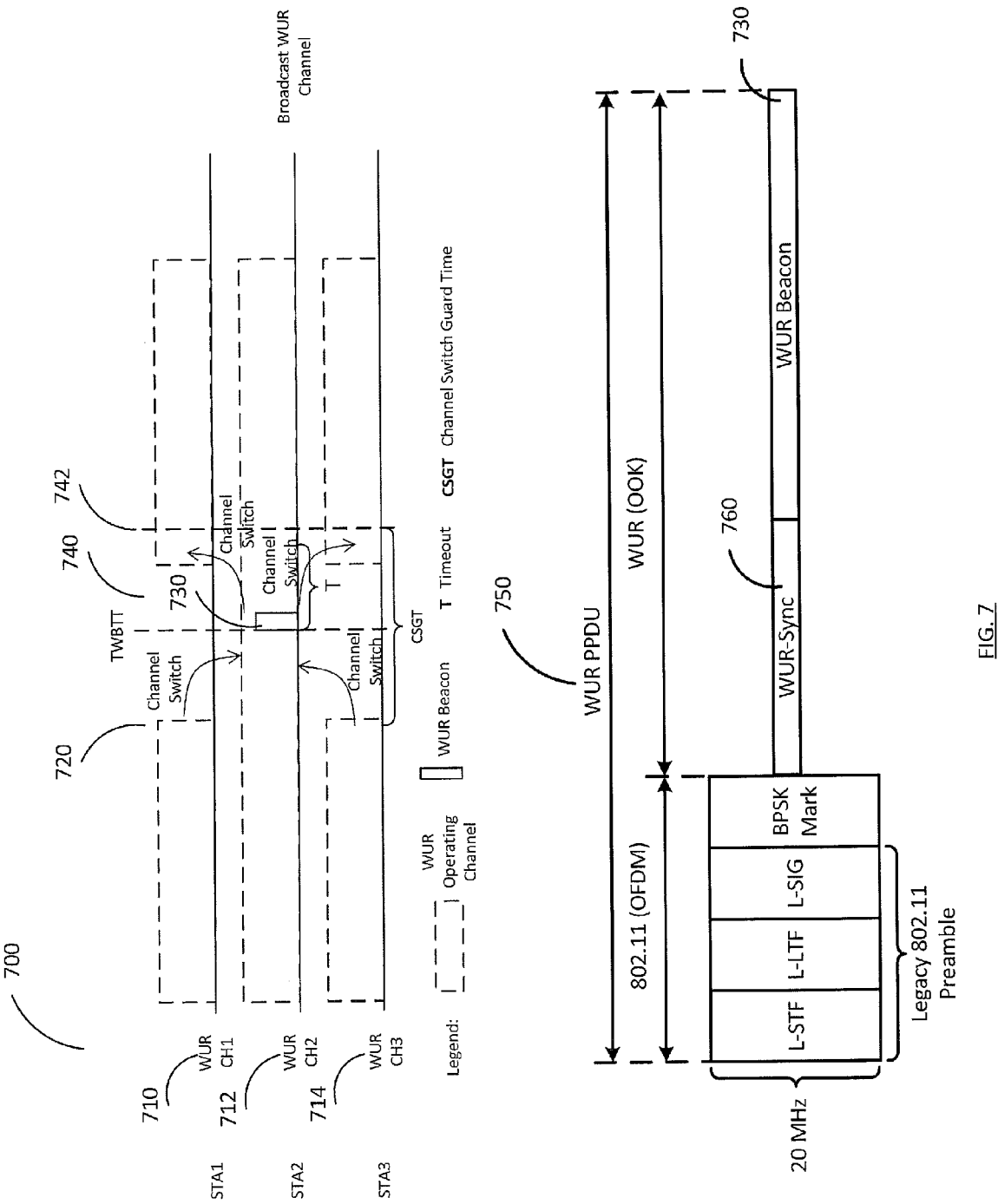
FIG. 7 shows an example scheme for transmission of scheduled broadcast WUR frames when multiple WUR operating channels are defined and the corresponding format of WUR PPDU used to carry the broadcast WUR frames as per the first embodiment.

As mentioned earlier, when multiple WUR channels are in operation within a BSS, WUR STAs may be assigned to different WUR channels. Since a WUR STA only listens to its assigned WUR channel while it is in WUR mode, the WUR STA may not receive broadcast WUR frames transmitted by the AP on other WUR channels. Since broadcast WUR frames are meant to be received by all WUR STAs in the BSS, missing them may have adverse effects on WUR STAs operation, such as loss of time synchronization. The WUR channel used by the AP to transmit broadcast WUR frames may also be referred to as the Broadcast WUR channel or the Base WUR channel or the Primary WUR channel of the BSS. FIG. 7 shows the transmission scheme 700 that is proposed to overcome the challenge of receiving scheduled broadcast WUR frames by WUR STAs. Three WUR Channels, WUR CH1 710, WUR CH2 712 and WUR CH3 714 are defined in the BSS and are assigned to WUR STA1, WUR STA2 and WUR STA3 respectively. WUR CH2 712 is designated as the Broadcast WUR channel by the AP and advertised in the BSS through the Broadcast WUR channel field 540 of the WUR Operation element 500. Taking WUR Beacon frames as an example of scheduled WUR frame, all the WUR STAs in the BSS would be aware of the next Target WUR Beacon Transmission Time (TWBTT) which is the expected transmission time of the next WUR Beacon by the AP. As per the proposed transmission scheme, the WUR Beacon frame 730 is only transmitted on the WUR Broadcast channel WUR CH2 712. Initially all three WUR STAs have their WURx tuned to their respective WUR channels. At time 720, slightly before the expected TWBTT, WUR STA1 and WUR STA3 switch their respective WURxs to the Broadcast WUR channel WUR CH2 712 and wait for the scheduled WUR Beacon frame 730. When Narrow band Multi-channel WUR Operation is used and all three WUR channels are within the same 20 MHz 802.11 channel, switching from either WUR CH1 710 or WUR CH3 714 to the central WUR CH2 712 may simply be a matter of tuning the WURx's frequency synthesizer without the need to change the oscillator and as such may not take much time and will have minimum impact on the WUR STA's power consumption. Once the WUR Beacon frame 730 has been received, at time 740 STA1 and STA3 switch their respective WURxs back to their assigned WUR channels. The WUR STAs may also switch back to their assigned WUR channels, if the WUR Beacon is not received within a certain timeout period T from the expected TWBTT. Since AP needs to contend for the wireless channel to transmit WUR Beacon frames, the timeout period T should be large enough to cater for possible channel access delays at the AP. Channel Switch Guard Time (CSGT) indicates the maximum time period that a WUR STA would be unavailable to receive WUR frames on its assigned WUR channel due to the WUR STA's WURx switching channel to the Broadcast WUR channel. CSGT gives an upper bound on the time that a WUR STA stays away from its assigned WUR channel, starting from time at which it switches to the Broadcast WUR channel to wait for a scheduled WUR frame such as a WUR Beacon and ending at the time that the WUR STA switches back to its assigned WUR channel, either upon receiving the scheduled WUR frame or upon expiration of the timeout T. Referring to FIG. 7, CSGT covers the time period starting at time 720 when the WUR STA3 switches to the Broadcast WUR channel WUR CH2 712 and ending at time 742 which is the latest time by which WUR STA3 should be back on its assigned WUR channel WUR CH3 714. CSGT may be a predetermined time defined by the IEEE 802.11ba specification and may be the same for all WUR STAs. However, since CGST needs to factor in various parameters related to a WUR STA's hardware capabilities such as the time required to switch channels, the time required to compensate for the WUR STA's clock drift etc., the CGST may vary greatly from WUR STA to WUR STA. The value of a WUR STA's CGST may also vary depending on whether the Broadcast WUR Channel and the WUR STA's assigned WUR channel are on the same or different frequency bands. As such, each WUR STA may also report its CGST to the AP during the WUR mode negotiation phase by using the Channel Switch Guard Time field 640 in the WUR capabilities element 600 in FIG. 6. An AP needs to ensure that it does not transmit any WUR frames to a WUR STA during the CGST. The AP may consider the CGST reported by each WUR STAs when making such transmission decision or it may be simpler for the AP to take the maximum value of the CGST of all associated WUR STAs. The WUR PPDU 750 is used to carry the WUR Beacon frame 730. In order to ensure the reliability of the transmission, WUR Beacon frame 730 will be expected to be transmitted at low data rate in which case the WUR-Sync field 760 will be constructed as shown in the WUR PPDU format 300 in FIG. 3. However, if the WUR Beacon frame 730 is transmitted at a high data rate, then the WUR-Sync field 760 will be constructed as shown in the WUR PPDU format 350 in FIG. 3.

Figure 8:
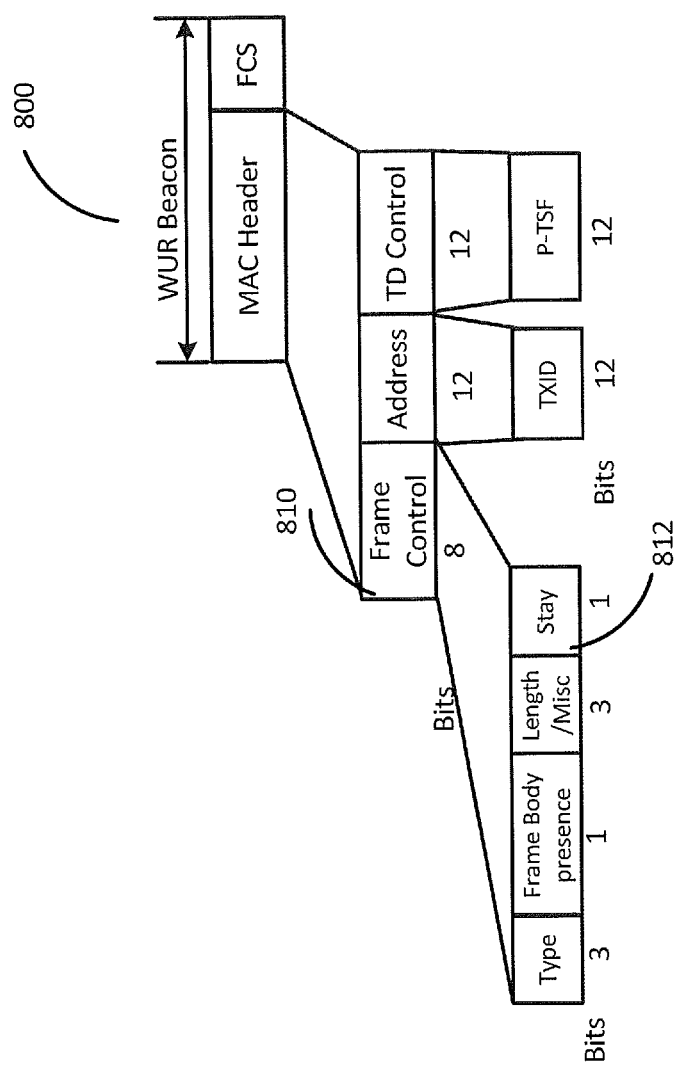
FIG. 8 shows the format of the WUR Beacon frame as per the first embodiment.

The transmission scheme 700 in FIG. 7 will help to overcome the challenge of receiving scheduled broadcast WUR frames by WUR STAs assigned to WUR channels other than the Broadcast WUR channel. However, the issue of receiving unscheduled broadcast WUR frames still remains since the WUR STAs on non-broadcast WUR channels are not aware when the AP will transmit unscheduled broadcast WUR frames. Unscheduled broadcast WUR frames may be transmitted by the AP to wake all the WUR STAs in a BSS to receive some critical broadcast frames on their PCR and missing such frames may cause disruptions to the operation of WUR STAs. An enhanced WUR Beacon frame 800 in FIG. 8 is proposed to overcome this issue of receiving unscheduled broadcast WUR frames. The Frame Control field 810 of the WUR Beacon 800 carries a Stay indication field, for example in the form of a Stay bit 812, which when set to 1 indicates to WUR STAs that the AP intends to transmit another broadcast WUR frame immediately after the WUR Beacon 800. The Stay bit 812 may also be one of the bits within the Length/Misc field 266 in FIG. 2. Considering that some of the WUR STAs in the BSS may be operating on duty cycle mode and may not wake up to receive all WUR Beacon frames, the AP may need to transmit the same broadcast WUR frame several times to make sure that all WUR STAs receive it. In such a circumstance, several consecutive WUR Beacons may carry the Stay indication. However, WUR STAs that are not operating in duty cycle mode may receive all the WUR Beacons, but the AP may not want such WUR STAs to continue staying on the Broadcast WUR channel to wait for the same broadcast WUR frames more than once. In such case, the Stay indication field may be a counter made up of 2 or 3 bits of the Length/Misc field 266 in FIG. 2, and a non-zero value of the Stay indication field indicates to WUR STAs that the AP intends to transmit another broadcast WUR frame immediately after the WUR Beacon 800. If a WUR STA has already received the broadcast WUR frame as well as the associated PCR frames transmitted by the AP after a WUR Beacon with the Stay Indication field set to a certain value X, the WUR STA may ignore the Stay Indication field in the next few consecutive WUR Beacons if the value of the Stay Indication field is the same value X, and may switch back immediately to its assigned WUR channel.

Figure 9:
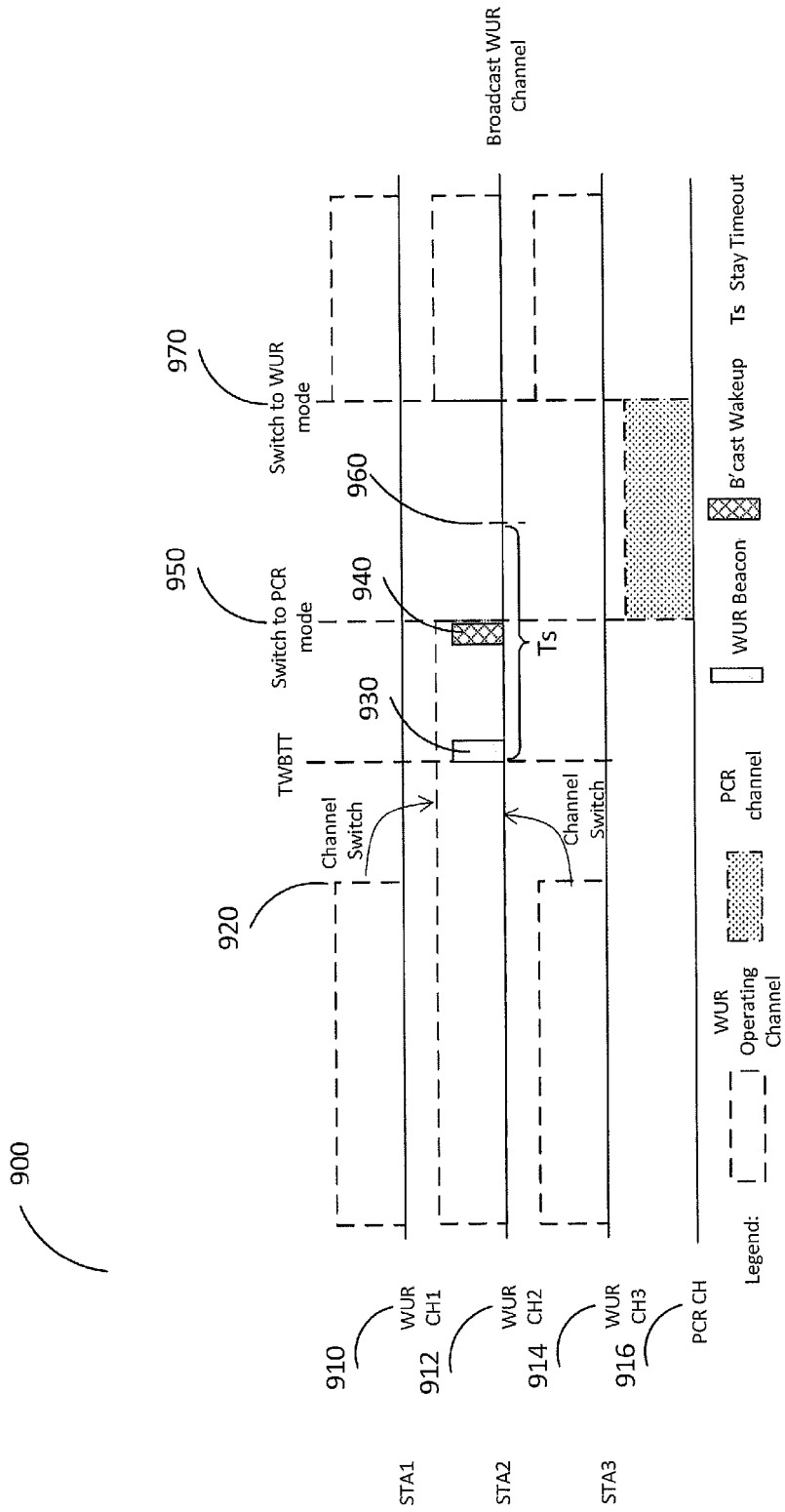
FIG. 9 shows an example scheme for transmission of unscheduled broadcast WUR frames when multiple WUR operating channels are defined as per the first embodiment.

FIG. 9 shows the transmission scheme 900 that is proposed to overcome the challenge of receiving unscheduled broadcast WUR frames by WUR STAs. Three WUR Channels, WUR CH1 910, WUR CH2 912 and WUR CH3 914 are defined in the BSS and are assigned to WUR STA1, WUR STA2 and WUR STA3 respectively. WUR CH2 912 is designated as the Broadcast WUR channel by the AP and advertised in the BSS through the Broadcast WUR channel field 540 of the WUR Operation element 500. Initially all three WUR STAs have their WURx tuned to their respective WUR channels. At time 920, slightly before the expected TWBTT, WUR STA1 and WUR STA3 switch their respective WURxs to the Broadcast WUR channel WUR CH2 912 to wait for the scheduled WUR Beacon frame 930. The WUR Beacon frame 930 follows the frame format 800 in FIG. 8 and whenever the AP has broadcast PCR frames to be transmitted, it schedules a broadcast Wake-up frame 940 to be transmitted on the broadcast WUR channel WUR CH2 912 right after the transmission of the next scheduled WUR Beacon frame. The Stay bit 812 in the Frame control field 810 of the scheduled WUR Beacon 930 is set to 1 to alert the WUR STAs of the pending transmission of the unscheduled broadcast WUR frame 940. Since the Stay bit is set to 1, instead of immediately switching back to their respective WUR channels, WUR STA1 and WUR STA3 will continue to listen on WUR CH2 912 and wait for the unscheduled broadcast WUR frame 940. Upon receiving the broadcast Wake-up frame 940 at time 950, all three WUR STAs turn on their PCR and switch to the PCR Channel 916 to wait for the PCR frames from the AP. Once the PCR session is over, at time 970, all three WUR STAs switch back to their respective WUR channels. The WUR STAs may also switch back to their assigned WUR channels at time 960, if the broadcast Wake-up frame 940 is not received within a certain timeout period Ts from the time the WUR Beacon 930 was received. The WUR STAs may also switch back to their assigned WUR channels, if the WUR Beacon is not received within a certain timeout period T from the expected TWBTT.

In a Narrow band Multi-channel WUR Operation, when Wake-up signal is only transmitted in a single sub-channel within a 20 MHz channel and the remaining sub-channels are left empty, there is a high risk of third party 802.11 devices being unable to detect the Wake-up signal during their channel sensing. Especially if the third party 802.11 devices missed the legacy portion of a WUR PPDU, due to the narrow band nature of the Wake-up signal portion of the WUR PPDU, its energy level when averaged over the 20 MHz sensing bandwidth will likely be lower than the 802.11 devices' Energy Detection (ED) threshold of −62 dBm. This could potentially lead to the 802.11 device treating the 20 MHz channel as being idle and transmitting over the Wake-up signal. This issue may be called the WUR Mid-packet CCA misdetection issue. In fact, even in normal WUR operation where only a single sub-channel is defined as WUR channel within a 20 MHz channel, the WUR Mid-packet CCA issue may occur. When Narrow band FDMA WUR transmission is used to simultaneously transmit Wake-up signals on all available sub-channels as shown in FIG. 4, the total energy level during the Wake-up signal portion will be higher and the risk of WUR Mid-packet CCA misdetection is reduced. However, even when the AP is capable of FDMA WUR transmission, it may happen that the number of WUR STAs to be woken up is less than the number of available sub-channels. In the worst case, the AP may only transmit a single Wake-up signal within a 20 MHz channel. In such cases, the WUR Mid-packet CCA misdetection may still occur.

Figure 10:
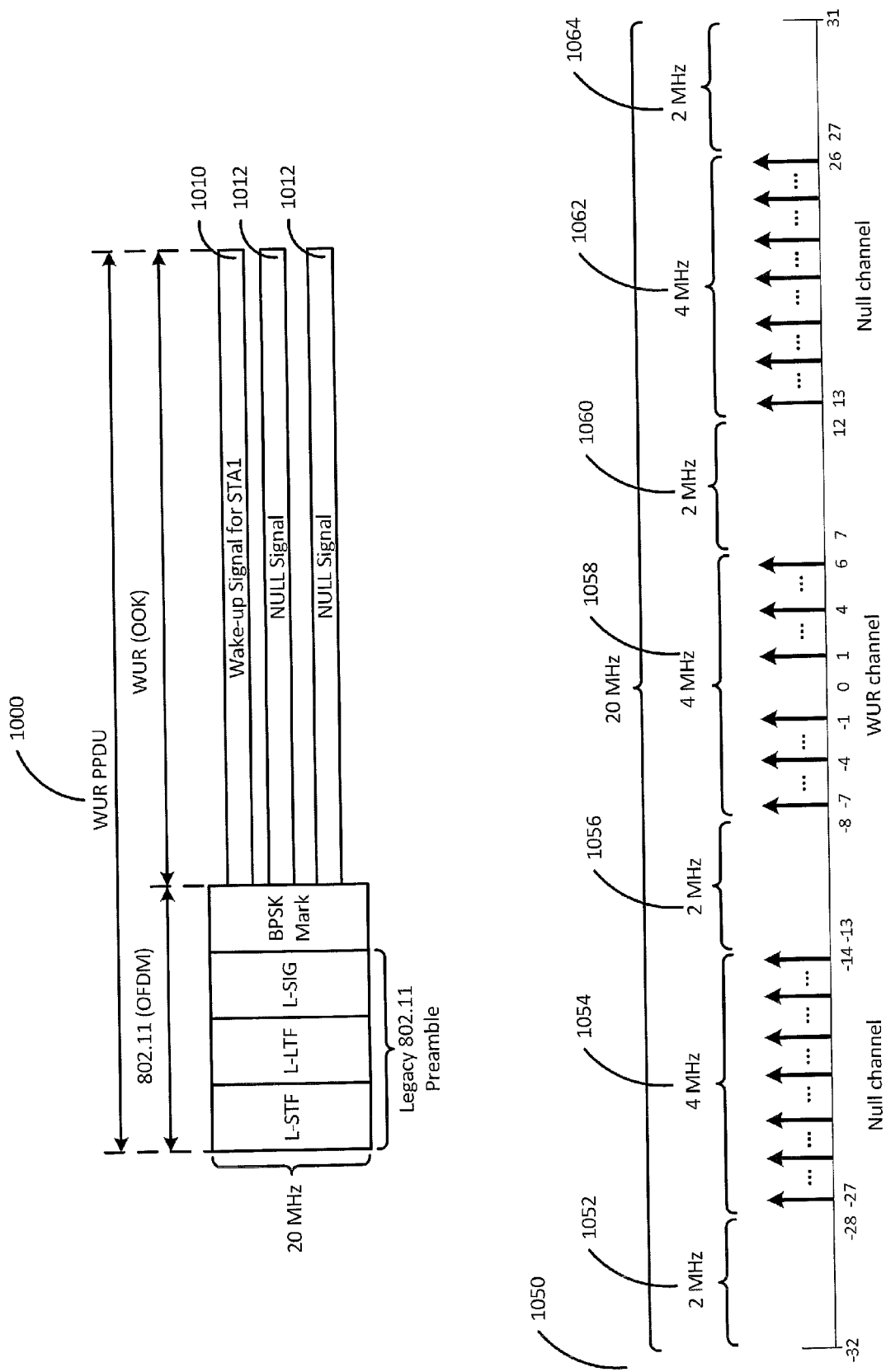
FIG. 10 shows an example scheme for transmission of a WUR PPDU as per the first embodiment when the number of WUR frames carried by the WUR PPDU is less than the number of available WUR channels.

FIG. 10 shows a proposed method of transmitting WUR PPDUs that reduce the risk of WUR Mid-packet CCA misdetection. In a Narrow band Multi-channel WUR Operation or during a Narrow band FDMA WUR transmission, in the event that at least one sub-channel within a 20 MHz channel is unused, a special signal called Null Signal is transmitted on the empty sub-channels. The Null Signal may also be referred to as Dummy Signal. For example, in the WUR PPDU 1000 only the top sub-channel is occupied with the Wake-up signal 1010 addressed to STA1. Since the center and bottom sub-channels do not have any Wake-up signals to be transmitted, the AP transmits the Null Signal 1012 on the two empty channels. However, in normal WUR operation where only a single sub-channel is defined as WUR channel within a 20 MHz channel, explicit definition of other sub-channels may not exist. For example, 1050 illustrates the frequency domain view of a 20 MHz 802.11 channel in terms of OFDM sub-carriers. A 20 MHz 802.11 channel consists of 64 OFDM subcarriers which are indexed from −32 to 31 with a subcarrier spacing of 312.5 KHz. In normal WUR operation, the center 13 subcarrier location ranging from −7 to 6 (except the DC subcarrier at location 0) are designated for transmission of Wake-up signal, and these 13 subcarriers make up the 4 MHz wide WUR channel 1058. This leaves 8 MHz empty on either side of the WUR Channel 1058, which may be used to transmit the Null Signal 1012. However, in order to reduce the risk of adjacent channel interference (ACI) to the Wake-up signal on the WUR channel 1058, subcarriers at locations −13 to −8, making up the 2 MHz space 1056 and the subcarriers at locations 7 to 12, making up the 2 MHz space 1060 are left unused. Similarly to reduce the risk of ACI to the other adjacent 20 MHz channels, subcarriers at locations −32 to −28, making up the 2 MHz space 1052 and the subcarriers at locations 27 to 31, making up the 2 MHz space 1064 are left unused. The subcarriers at location −27 to −14 and the subcarriers at location 13 to 26, each making up 4 MHz may be designated as Null channels 1054 and 1062 respectively and used by the AP to transmit the Null Signal 1012. Since the purpose of transmitting the Null Signal is primarily to reduce the risk of WUR Mid-packet CCA misdetection by 802.11 devices operating in PCR mode, WUR STAs need not be aware of the existence of the Null channels. Alternatively, it is also possible that the Null channels are not explicitly defined and AP may populate the unused subcarriers on either side of the WUR channel as per their needs in order to raise the energy level of the WUR portion of a WUR PPDU. However care should be taken to reduce the risk of interference to the Wake-up signal or to the other adjacent 20 MHz channels.

Figure 11:
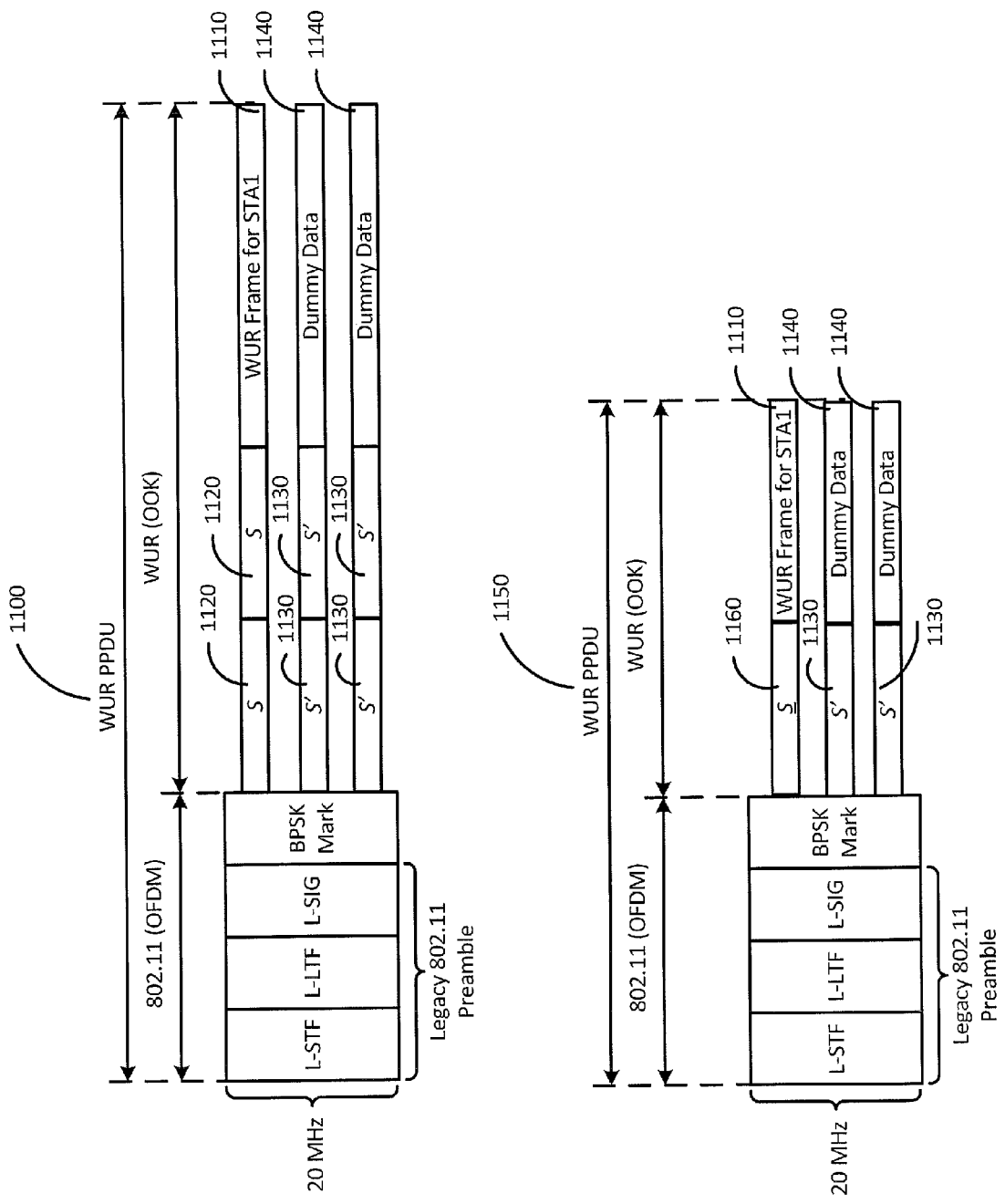
FIG. 11 shows example formats of the Null signal as per the first embodiment.

FIG. 11 shows specific methods of constructing the Null signal 1012 introduced in FIG. 10 for both the low data rate as well as the high data rate Wake-up signals. As mentioned earlier in FIG. 3, two 32-bit sequences S 310 and S̲ 360 are used in the WUR-Sync field to indicate the data rate of the WUR frame carried in the WUR-Data field. Since the two 32-bit sequences S 310 and S̲ 360 are known to all WUR STAs, when listening for Wake-up signals, each WUR STA's WURx uses the known 32-bit sequences S 310 and S̲ 360 to cross-correlate with the WUR-Sync of the received Wake-up signal and to detect a valid Wake-up signal. In order to minimize the risk of the Null Signal being detected as a valid Wake-up signal, a special 32-bit sequence S' is defined. The 32-bit sequence S' is designed to have very low cross-correlation ratio with both S and S̲. The 32-bit sequence S' has the same symbol duration as S and S̲. In FIG. 11 S 1120 and S̲ 1160 are the same as S 310 and S̲ 360 in FIG. 3 respectively. WUR PPDU 1100 is an example where the low data rate Null Signal is used. A valid Wake-up signal is transmitted on the first WUR channel at the low data rate. The WUR-Sync field of the low data rate Wake-up signal is constructed by concatenating two 32-bit sequences S 1120 followed by the WUR frame 1110 addressed to WUR STA1 and transmitted at the low data rate of 62.5 kb/s. On each of the other two empty WUR channels, the low data rate Null Signal is transmitted. The low data rate Null signal is constructed by concatenating two 32-bit sequences S' 1130 followed by the Dummy Data 1140 which is also transmitted at the low data rate of 62.5 kb/s and is of the same length as the WUR Frame 1110. WUR PPDU 1150 is an example where the high data rate Null Signal is used. A valid Wake-up signal is transmitted on the first WUR channel at the high data rate. The WUR-Sync field of the high data rate Wake-up signal is made up of the 32-bit sequences S̲ 1160 followed by the WUR frame 1110 addressed to WUR STA1 and transmitted at the high data rate of 250 kb/s. On each of the other two empty WUR channels, the high data rate Null Signal is transmitted. The high data rate Null signal is constructed by transmitting the 32-bit sequences S' 1130 followed by the Dummy Data 1140 which is also transmitted at the high data rate of 250 kb/s and is of the same length as the WUR Frame 1110. The Dummy Data 1140 may be constructed in a variety of way. In one instance, the Dummy Data 1140 may be a series of all 1s, or all 0s or it may be a series of alternative 1s and 0s. Alternatively, the Dummy Data 1140 may also be a copy of the WUR frame 1110. In the event where there are two valid Wake-up signals within a WUR PPDU, the Dummy Data may be a copy of the WUR Frame carried within either of the two Wake-up signals.

Second Embodiment

Figure 12:
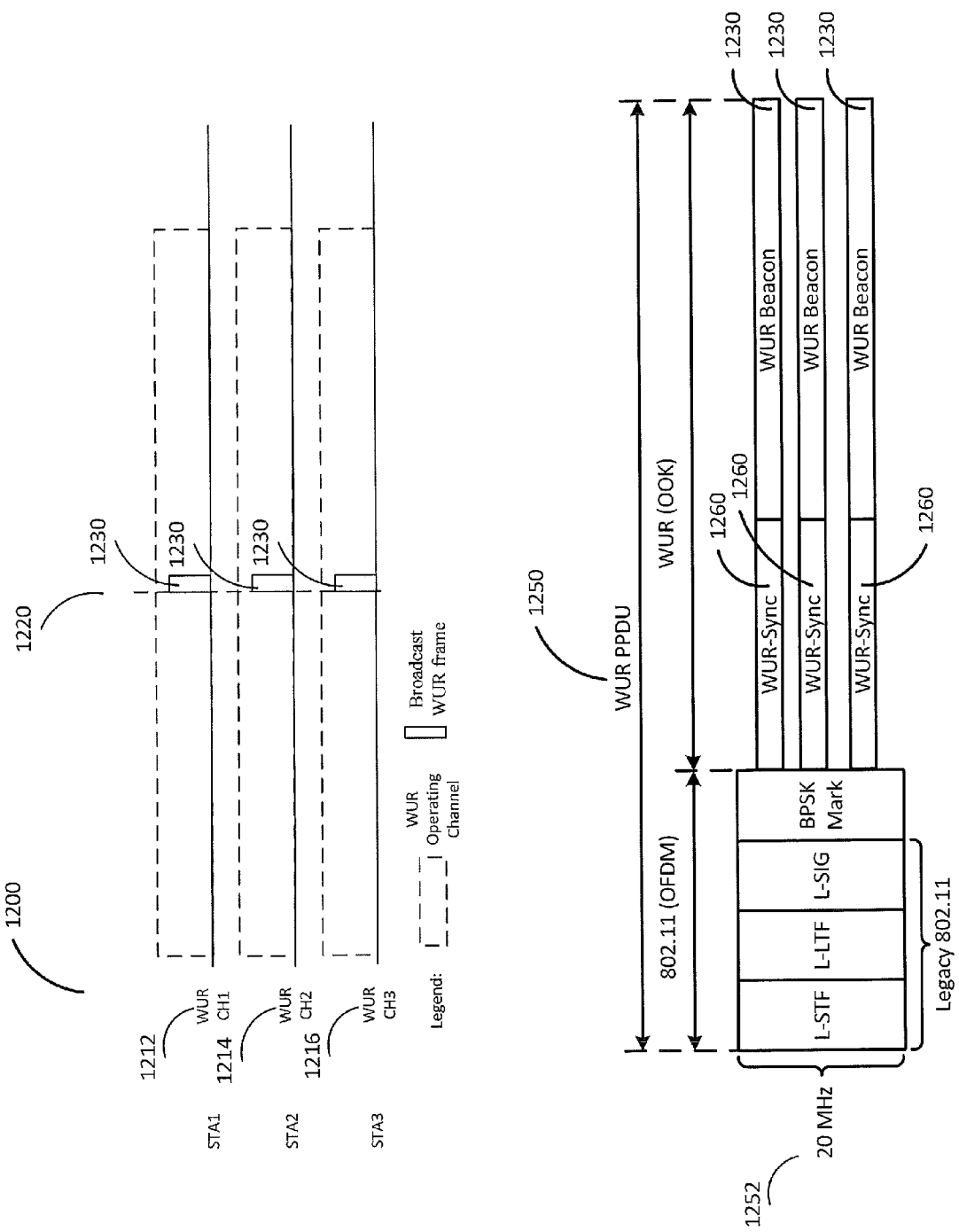
FIG. 12 shows an alternative example scheme for transmission of broadcast WUR frames when multiple WUR operating channels are defined and the corresponding format of WUR PPDU used to carry the broadcast WUR frame as per a second embodiment.

Coming back to the issue of the WUR STAs that may not receive broadcast WUR frames transmitted by the AP on other WUR channels when multiple WUR channels are in operation within a BSS; an alternative transmission scheme 1200 to solve the issue using Narrow band FDMA WUR transmission is shown in FIG. 12. When the AP and all associated WUR STAs are capable of FDMA transmissions, the AP transmits the same broadcast WUR frame (either scheduled or unscheduled) on all available WUR channels within a 20 MHz channel. Three WUR Channels, WUR CH1 1212, WUR CH2 1214 and WUR CH3 1216 are defined in the BSS and are assigned to WUR STA1, WUR STA2 and WUR STA3 respectively. At time 1220, the AP transmits the WUR PPDU that carries the same broadcast WUR frame 1230 on all the three WUR Channels. This ensures that all WUR STAs, regardless of the assigned WUR channel, receive the broadcast WUR frame 1230. Taking WUR Beacon frames as an example of the broadcast WUR frame 1230, WUR PPDU 1250 may be used to carry the WUR Beacon frame 1230. WUR PPDU 1250 is transmitted using the Narrow band FDMA scheme with the same Wake-up signal being duplicated on each of WUR channel within the 20 MHz channel 1252. In order to ensure the reliability of the transmission, WUR Beacon frame 1230 will be expected to be transmitted at low data rate in which case the WUR-Sync field 1260 will be constructed as shown in the WUR PPDU format 300 in FIG. 3. However, if the WUR Beacon frame 1230 is transmitted at a high data rate, then the WUR-Sync field 1260 will be constructed as shown in the WUR PPDU format 350 in FIG. 3. The transmission scheme 1200 may be preferable for WUR STAs, since the reception of broadcast WUR frames is transparent to the WUR STAs and no extra operation such as channel switching is required. However, this scheme requires both the AP and the WUR STAs to be capable of FDMA transmission.

Figure 13:
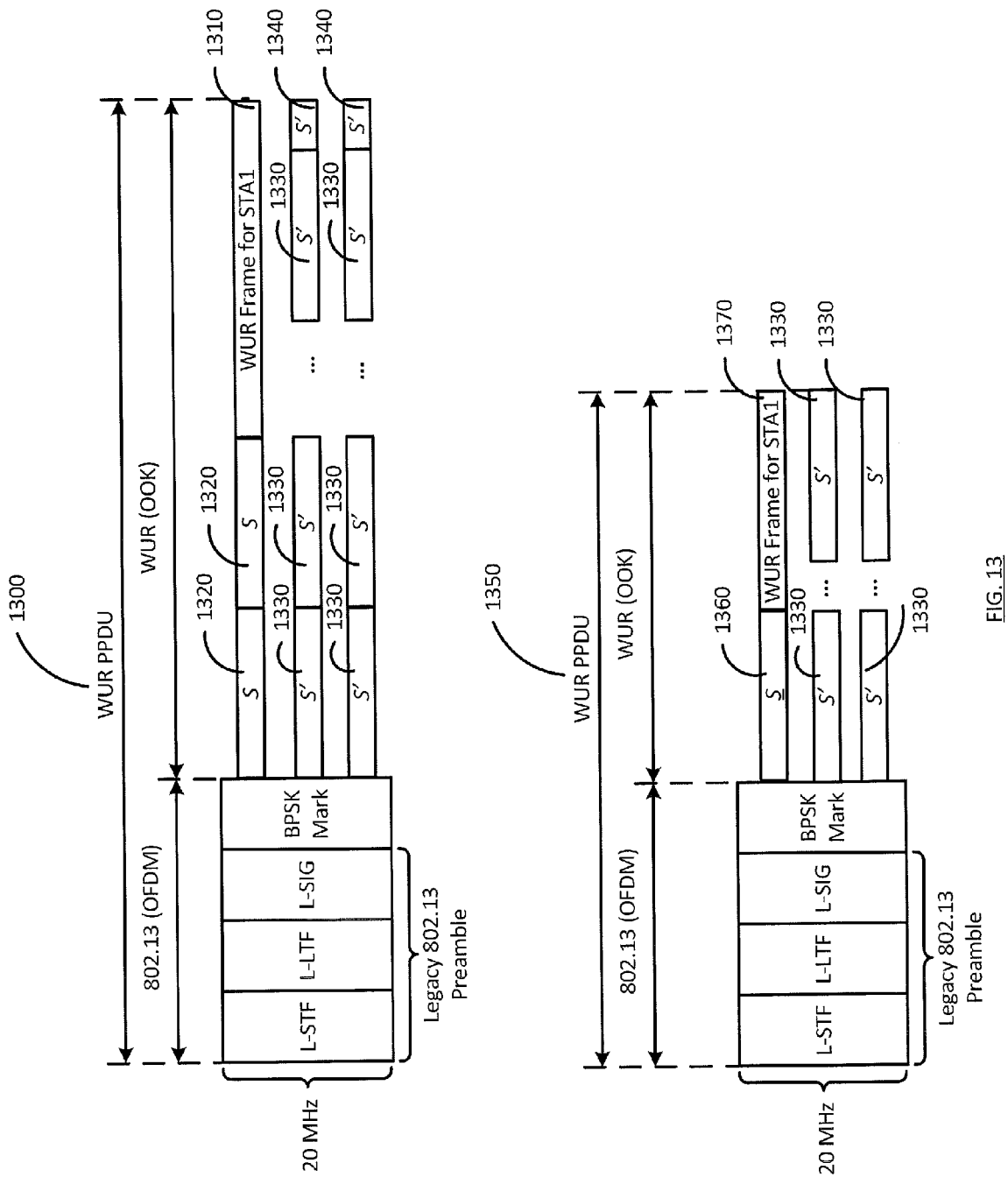
FIG. 13 shows alternative example formats of the Null signal as per the second embodiment.

FIG. 13 shows an alternative method of constructing the Null signal 1012 introduced in FIG. 10 for both the low data rate as well as the high data rate Wake-up signals. In FIG. 13 S 1320 and S̲ 1360 are the same as S 310 and S̲ 360 in FIG. 3 respectively while S' 1330 is the same as the 32-bit sequence S' 1130 in FIG. 11. WUR PPDU 1300 is an example where a low data rate WUR Frame is transmitted. A valid Wake-up signal is transmitted on the first WUR channel at the low data rate. The WUR-Sync field of the low data rate Wake-up signal is constructed by concatenating two 32-bit sequences S 1320 followed by the WUR frame 1310 addressed to WUR STA1 and transmitted at the low data rate of 62.5 kb/s. On each of the other two empty WUR channels, the Null Signal is transmitted. In this case, the Null signal is constructed by repeatedly transmitting the 32-bit sequences S' 1330 until the end of the WUR PPDU 1300. Since each 32-bit sequences S' 1330 is 64 micro-seconds long, in case the length of the WUR Frame 1310 is not a multiple of 64 micro-seconds, transmission of the last 32-bit sequences S' 1340 is terminated early at the boundary of the end of WUR PPDU 1300. WUR PPDU 1350 is an example where a high data rate WUR Frame is transmitted. A valid Wake-up signal is transmitted on the first WUR channel at the high data rate. The WUR-Sync field of the high data rate Wake-up signal is made up of the 32-bit sequences S̲ 1360 followed by the WUR frame 1370 addressed to WUR STA1 and transmitted at the high data rate of 250 kb/s. On each of the other two empty WUR channels, the Null Signal is transmitted. In this case, the Null signal is constructed repeatedly transmitting the 32-bit sequences S' 1330 until the end of the WUR PPDU 1350. Although not shown in FIG. 13, in case the length of the WUR Frame 1370 is not a multiple of 64 micro-seconds, transmission of the last 32-bit sequences S' 1330 is terminated early at the boundary of the end of WUR PPDU 1350. Although in FIG. 11 as well as in FIG. 13, specific formats are suggested for the Null Signal, however it is also possible that the Null Signal is not explicitly defined and the Null Signal is any form of transmission by the AP to create energy on the empty WUR channels, or the Null channels introduced in FIG. 10. For example the Null Signal may be a series of all 1s, or all 0s or it may be a series of alternative 1s and 0s or any other vendor specific signal that is transmitted at a similar transmit power as a valid Wake-up signal within the same WUR PPDU.

Third Embodiment

Figure 14:
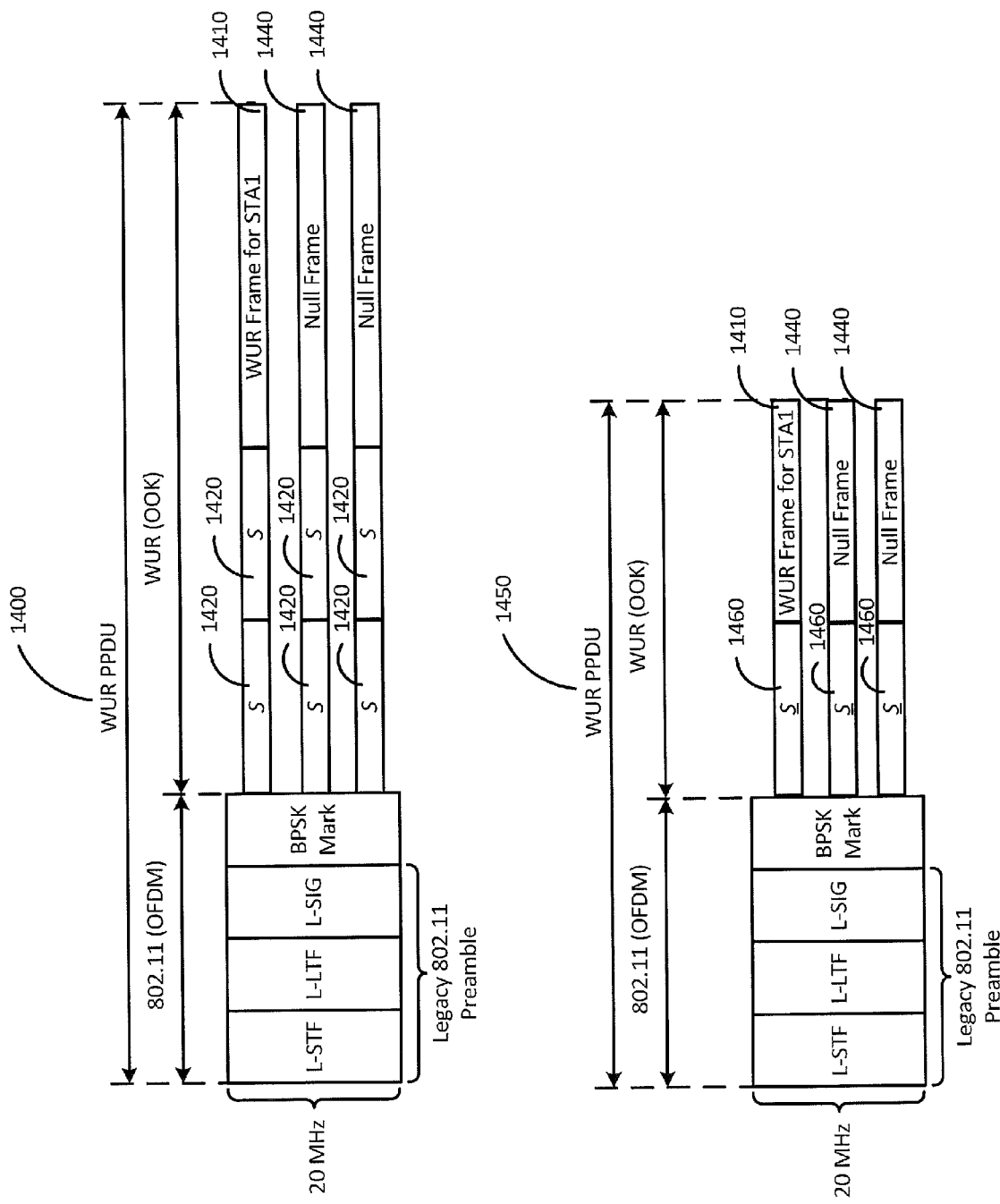
FIG. 14 shows alternative example schemes for transmission of a WUR PPDU as per a third embodiment when the number of WUR frames carried by the WUR PPDU is less than the number of available WUR channels.

FIG. 14 shows yet another alternative method of constructing the Null signal 1012 introduced in FIG. 10 for both the low data rate as well as the high data rate Wake-up signals. In FIG. 14 S 1420 and S̲ 1460 are the same as S 310 and S̲ 360 in FIG. 3 respectively. WUR PPDU 1400 is an example where a low data rate WUR Frame is transmitted and is same as WUR PPDU 1100 in FIG. 11 except for the construction of the Null Signal. Similarly WUR PPDU 1450 is an example where a high data rate WUR Frame is transmitted and is same as WUR PPDU 1150 in FIG. 11 except for the construction of the Null Signal. A new type of WUR frame called Null Frame 1440 is defined. The new Null frame is identified by defining a new Type field 262 in the Frame control field 242 in FIG. 2. The rest of the content of the Null Frame 1440 is exactly the same as the WUR Frame 1410. For the low data rate case, the Null Signal is constructed by concatenating two copies of the 32-bit sequence S 1420 followed by the Null Frame 1440 transmitted at the low data rate. For the high data rate case, the Null Signal is made up of the 32-bit sequence S̲ 1460 followed by the Null Frame 1440 transmitted at the high data rate. This method may be preferable for the AP since the construction of the Null signal is simpler; however the WUR STAs may end up syncing to the Null Signal as a potential valid Wake-up signal. However, once the WUR STAs read the Frame Type field 262, the Null frame will be identified and the WUR STAs can ignore the rest of the Wake-up Signal.

Fourth Embodiment

Figure 15:
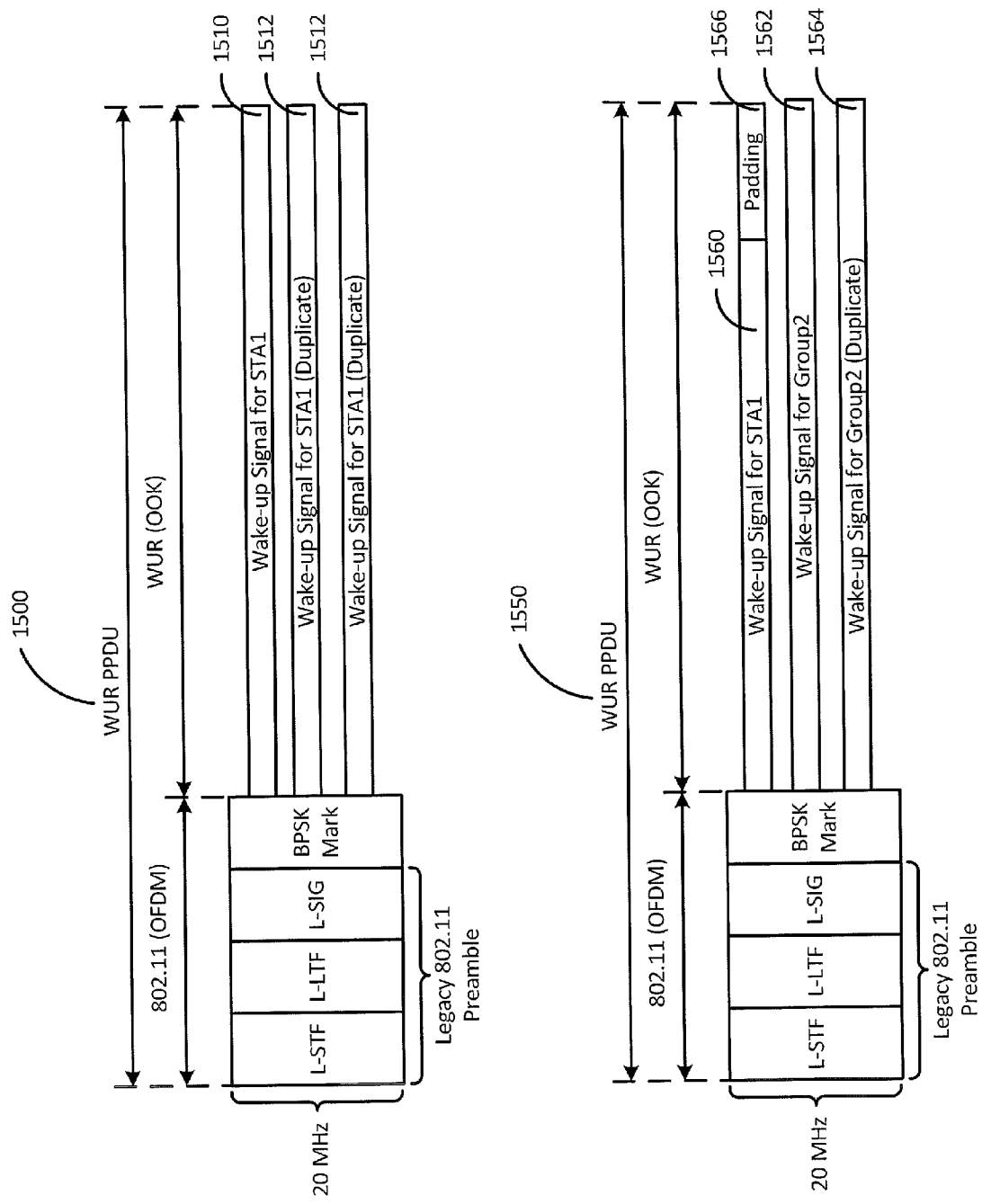
FIG. 15 shows alternative example schemes for transmission of a WUR PPDU as per a fourth embodiment when the number of WUR frames carried by the WUR PPDU is less than the number of available WUR channels.

FIG. 15 shows yet another alternative method of constructing the Null signal 1012 introduced in FIG. 10. In WUR PPDU 1500, a valid Wake-up signal 1510 addressed to WUR STA1 is transmitted on the first WUR channel. As for the second and third WUR Channels, the duplicate of Wake-up signal 1510 is used as the Null Signal 1512 and transmitted at the same data rate as the Wake-up signal 1510. Similarly, in WUR PPDU 1550, a valid Wake-up signal 1560 addressed to WUR STA1 is transmitted on the first WUR channel while a Wake-up Signal 1562 addressed to Group2, a group of WUR STAs, is transmitted on the second WUR channel. Since group addressed WUR frames are Variable Length (VL) WUR frames and may carry the frame body 250 shown in FIG. 2, the Wake-up Signal 1562 is likely to be longer than the Wake-up signal 1560. In this case, the duplicate of the longer Wake-up signal 1562 is used as the Null Signal 1564 and transmitted on the third WUR channel at the same data rate as the Wake-up signal 1562. Since the Wake-up signal 1560 is shorter, the transmission on the first WUR channel will end earlier and this may cause the energy level of the WUR portion of the WUR PPDU 1550 to drop. To prevent this, the padding field 1566 is added to the end of the Wake-up Signal 1560 to align the transmission end time to the end of the WUR PPDU 1550. The padding field 1566 may be a series of all 1s, or all 0s or it may be a series of alternative 1s and 0s and is transmitted at the same data rate as the WUR-Data field of the Wake-up signal 1560.

Fifth Embodiment

Figure 16:
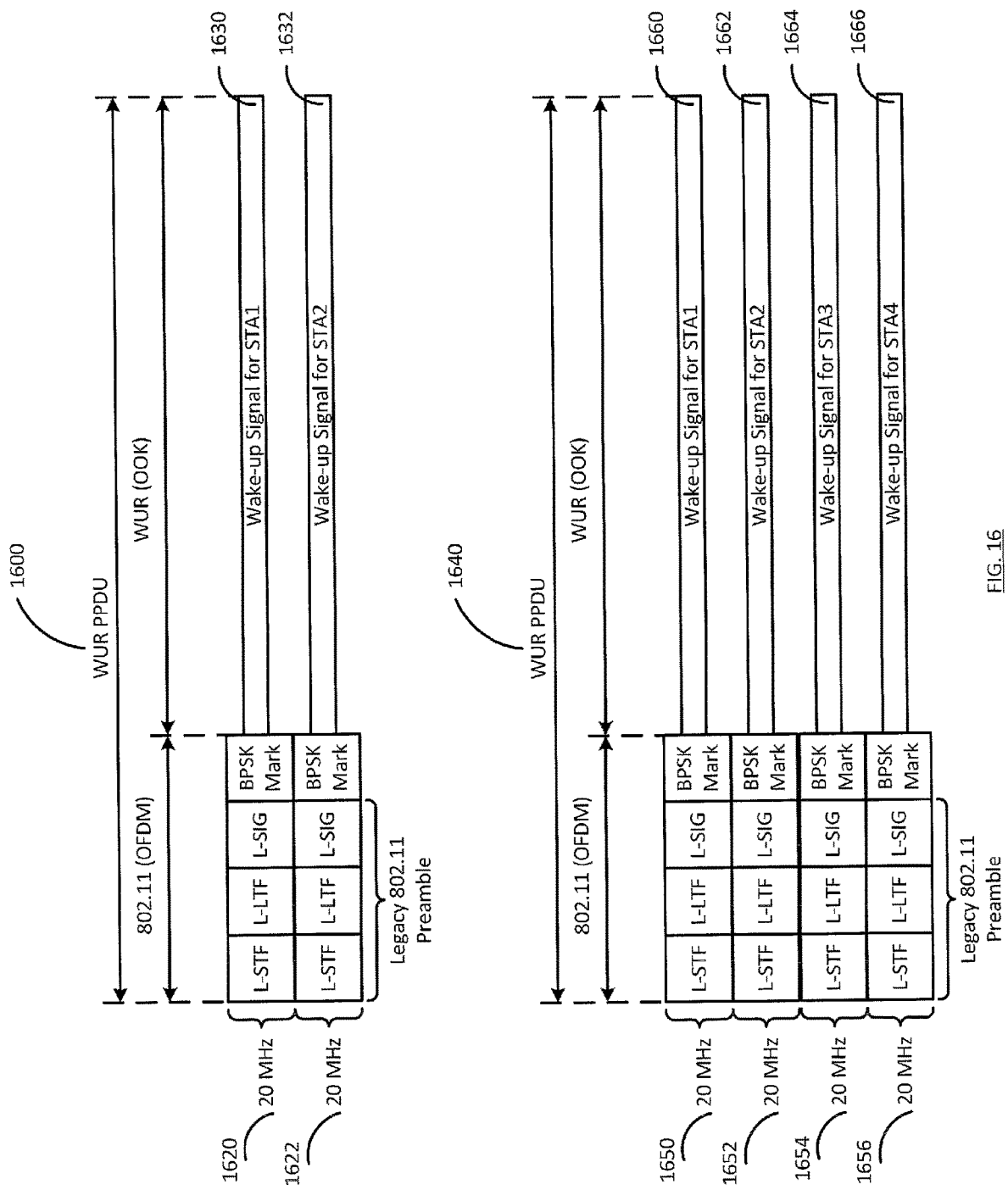
FIG. 16 shows an alternative WUR FDMA transmission scheme as per a fifth embodiment.

Earlier, Narrow band multi-channel WUR operation that defines multiple narrow sub-channels within a 20 MHz 802.11 channel as shown in FIG. 4, was introduced as one method to create a multi-channel WUR operation. Similarly Narrow band FDMA WUR transmission scheme was introduced as the simultaneous transmission of multiple Wake-up signals on the sub-channels within a same 20 MHz 802.11 channel. An alternative method to achieve multi-channel WUR operation is shown in FIG. 16 in which only a single WUR channel is defined within a 20 MHz 802.11 channel, but multiple 20 MHz 802.11 channels may be used in the BSS to carry WUR signals. To differentiate from Narrow band multi-channel WUR operation, such method may be known as Wide band multi-channel WUR operation. In Wide band multi-channel WUR operation, since a single WUR channel is defined within a 20 MHz 802.11 channel, the 20 MHz channel itself may be referred to as a WUR channel even though only a narrow portion of the 20 MHz channel is actually used for transmission of Wake-up signal. When multiple 20 MHz 802.11 channels are contiguous in the frequency domain, multiple Wake-up signals may be transmitted simultaneously. In the special case of the non-contiguous 80+80 MHz channel, multiple Wake-up signals may be also transmitted simultaneously within each contiguous 80 MHz within the 80+80 MHz channel. Since multiple 20 MHz 802.11 channels are involved, this may be referred to as Wide band FDMA WUR transmission. Two examples of Wide band FDMA WUR transmission are shown in FIG. 16. WUR PPDU 1600 is an example of a WUR PPDU that simultaneously carries two Wake-up signals over 40 MHz by using Wide band FDMA WUR transmission scheme. Two WUR STAs, WUR STA1 and WUR STA2 are assigned on adjacent WUR channels 1620 and 1622 respectively. The legacy 802.11 preamble and the BPSK Mark symbols of the WUR PPDU 1600 are duplicated on each 20 MHz channel and transmitted over the entire 40 MHz similar to the non-HT duplicate PPDU format in 802.11n and 802.11ac. Wake-up signal 1630 is addressed to WUR STA1 and is transmitted on the WUR channel 1620 while Wake-up signal 1632 is addressed to WUR STA2 and is transmitted on the WUR channel 1622.

Similarly, WUR PPDU 1640 is an example of a WUR PPDU that simultaneously carries four Wake-up signals over 80 MHz by using Wide band FDMA WUR transmission scheme. Four WUR STAs, WUR STA1, WUR STA2, WUR STA3 and WUR STA4 are assigned on adjacent WUR channels 1650, 1652, 1654 and 1656 respectively. The legacy 802.11 preamble and the BPSK Mark symbols of the WUR PPDU 1640 are duplicated on each 20 MHz channel and transmitted over the entire 80 MHz. Wake-up signal 1660 is addressed to WUR STA1 and is transmitted on the WUR channel 1650, Wake-up signal 1662 is addressed to WUR STA2 and is transmitted on the WUR channel 1652, Wake-up signal 1664 is addressed to WUR STA3 and is transmitted on the WUR channel 1654 while Wake-up signal 1666 is addressed to WUR STA4 and is transmitted on the WUR channel 1656. In terms of the capabilities of WUR STAs, since only one WUR channel is allocated per 20 MHz channel, the WUR STAs are not required to have any special hardware capabilities to be able to receive Wake-up signals transmitted in the Wide band FDMA scheme. As such, the WUR Device class listed in table 650 in FIG. 6 only needs to be differentiated into Class A and Class B devices and both classes are capable of receiving FDMA WUR transmission.

When Wide band multi-channel WUR operation is in operation within a BSS, the reception of individually addressed WUR frames is transparent to the WUR STAs assigned to different WUR channels. However, the issue of the WUR STAs not receiving broadcast WUR frames transmitted by the AP on other WUR channels still remains. The transmission schemes 700 in FIG. 7 and the transmission scheme 900 in FIG. 9 are also applicable for the case of Wide band multi-channel WUR operation, except that instead of being within the same 20 MHz channel, the WUR channels are on different 20 MHz channel. In Wide band multi-channel WUR operation, when the WUR channels are the same as the PCR channels, it is recommended that the Primary 20 MHz channel used by the PCR is designated as the Broadcast WUR Channel. In this case, there is no need for the AP to notify the Broadcast WUR Channel. However, if the WUR channels are different from the PCR channels, or if the AP decides for any reason to designate a 20 MHz channel other than the PCR Primary 20 MHz channel as the Broadcast WUR Channel, the AP needs to advertise the Broadcast WUR channel using the WUR Operation element 500 in FIG. 5A. The AP only transmits the broadcast WUR frames on the Broadcast WUR channel, for example using the WUR PPDU 750 in the case of WUR Beacon frames. All WUR STAs that are assigned to WUR Channels other than the Broadcast WUR channel can switch to the Broadcast WUR channel to receive the broadcast WUR frames at the expected transmission time.

Figure 17:
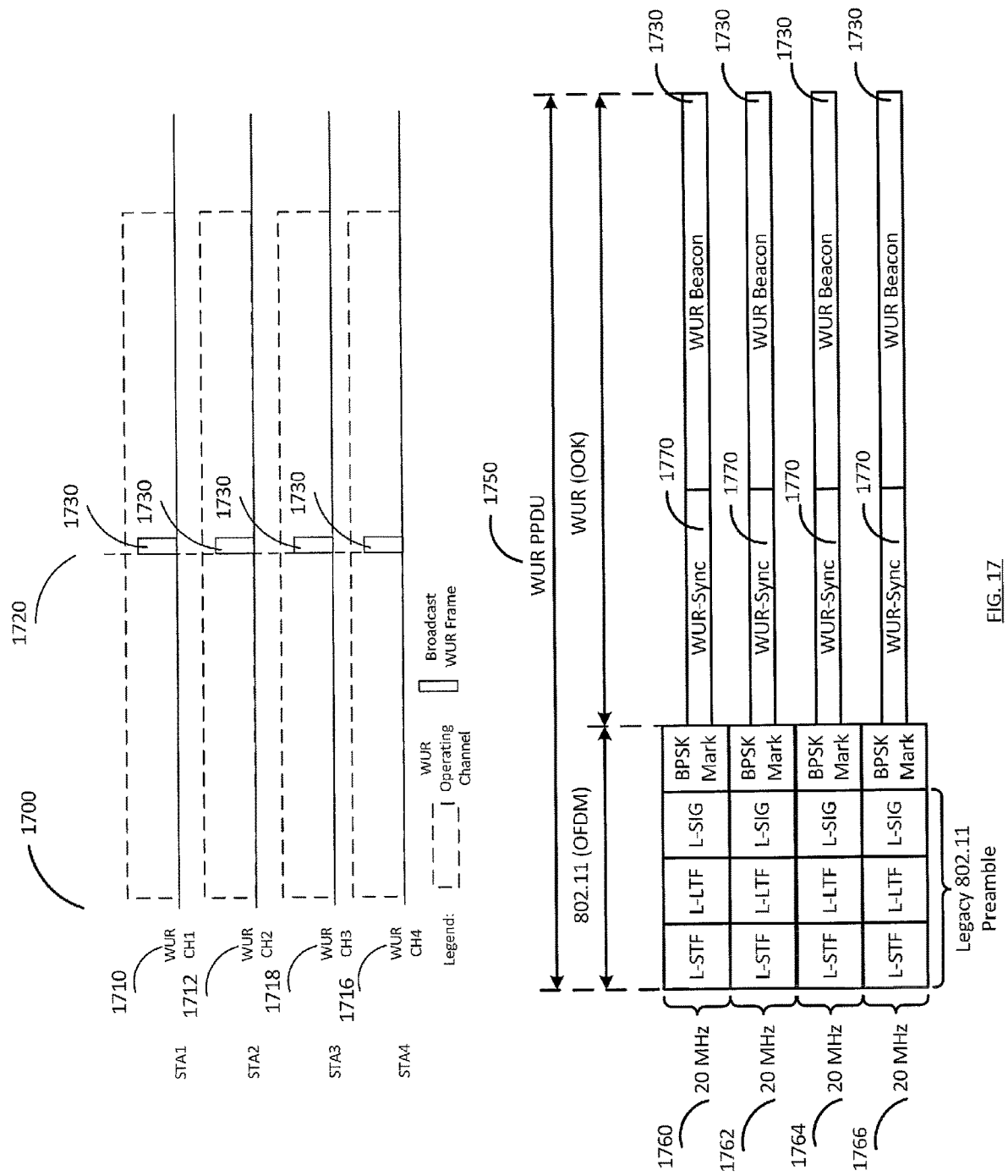
FIG. 17 shows alternative example scheme for transmission of broadcast WUR frames when multiple WUR operating channels are defined and the corresponding format of WUR PPDU used to carry the broadcast WUR frame as per the fifth embodiment.

When the AP is capable of Wide band FDMA transmissions, the issue of broadcast WUR frames may be solved by using Wide band FDMA transmissions whereby the AP transmits the broadcast WUR frame (either scheduled or unscheduled) on all available WUR channels simultaneously. An example transmission 1700 is shown in FIG. 17. Four WUR channels, WUR CH1 1710, WUR CH2 1712, WUR CH3 1714 and WUR CH4 1716 are defined in the BSS and are assigned to WUR STA1, WUR STA2, WUR STA3 and WUR STA4 respectively. The WUR channels WUR CH1 1710, WUR CH2 1712, WUR CH3 1714 and WUR CH4 1716 are located within the 20 MHz channels 1760, 1762, 1764 and 1766 respectively. At time 1720, the AP transmits the WUR PPDU that carries the same broadcast WUR frame 1730 on all the four WUR Channels. This ensures that all WUR STAs, regardless of the assigned WUR channel, receive the broadcast WUR frame 1730. Taking WUR Beacon frames as an example of the broadcast WUR frame 1730, WUR PPDU 1750 may be used to carry the WUR Beacon frame 1730. WUR PPDU 1750 is transmitted over 80 MHz using the Wide band FDMA scheme with the same signal being duplicated on each of the 20 MHz channels 1760, 1762, 1764 and 1766. In order to ensure the reliability of the transmission, WUR Beacon frame 1730 will be expected to be transmitted at low data rate in which case the WUR-Sync field 1770 will be constructed as shown in the WUR PPDU format 300 in FIG. 3. However, if the WUR Beacon frame 1730 is transmitted at a high data rate, the WUR-Sync field 1770 will be constructed as shown in the WUR PPDU format 350 in FIG. 3. The transmission scheme 1700 may be preferable for WUR STAs, since the reception of broadcast WUR frames is transparent to the WUR STAs and no extra operation such as channel switching is required. However, this scheme requires the AP to be capable of Wide band FDMA transmission.

Figure 18:
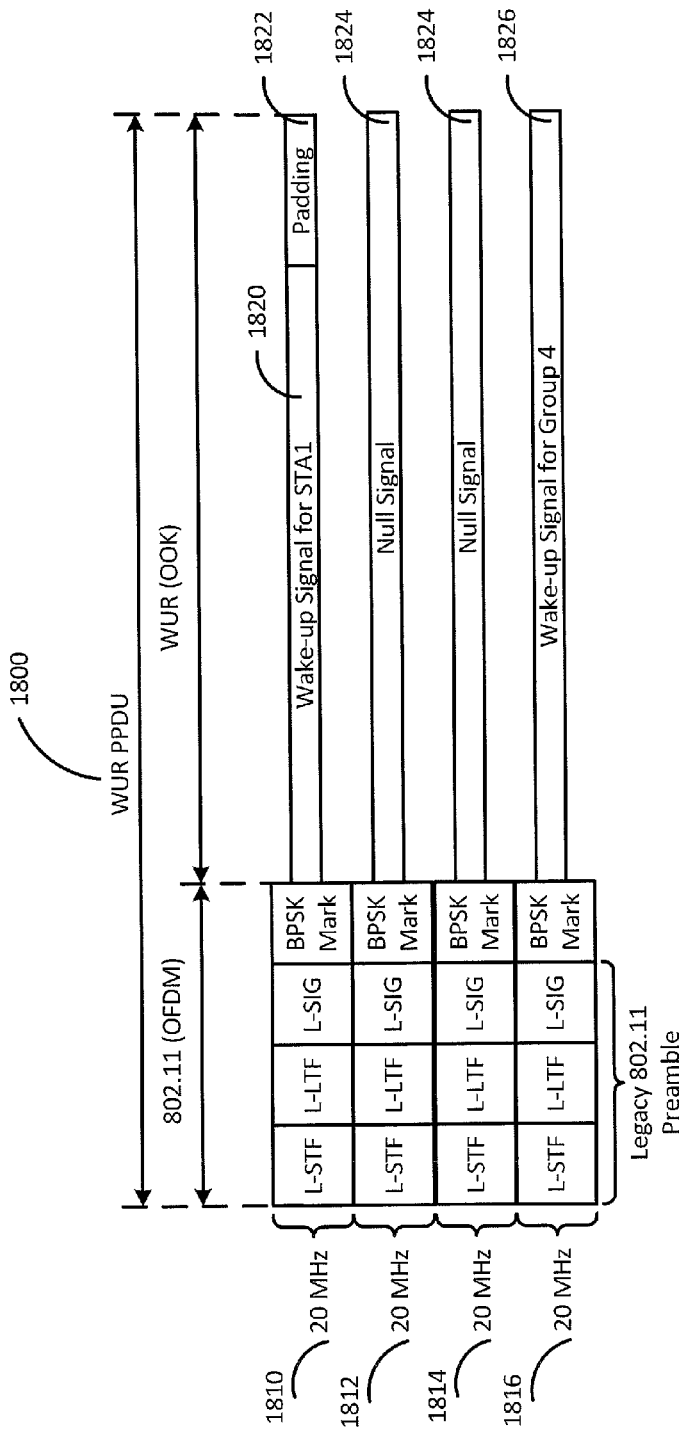
FIG. 18 shows alternative example schemes for transmission of a WUR PPDU as per the fifth embodiment when the number of WUR frames carried by the WUR PPDU is less than the number of available WUR channels.

When a WUR PPDU is transmitted using the Wide band FDMA transmission, the AP is able to simultaneously transmit multiple Wake-up signals addressed to different WUR STAs. However, the AP is required to follow the IEEE 802.11 wideband channel access rules before transmitting the WUR PPDU using the Wide band FDMA scheme and one of the rules requires that the primary 20 MHz channel of the BSS is included in all wide band transmissions. FIG. 18 shows the WUR PPDU 1800 that can simultaneously carry four Wake-up signals over 80 MHz using Wide band FDMA WUR transmission scheme. Three WUR STAs, WUR STA1, WUR STA2 and WUR STA3 are assigned on adjacent 20 MHz channels 1810, 1812 and 1814 respectively while two WUR STAs, WUR STA4 and WUR STA5 are assigned on the 20 MHz channel 1816. Further WUR STA4 and WUR STA5 are grouped together by the AP as part of Group 4. Channel 1810 is the primary 20 MHz channel of the BSS, channel 1812 is the secondary 20 MHz channel while channels 1814 and 1816 together make up the secondary 40 MHz channel. As per the IEEE 802.11 channel access rules, if the AP needs to wake up either WUR STA4 or WUR STA5, since they are assigned to the secondary 40 MHz channel, the AP will need to transmit the WUR PPDU 1800 over the entire 80 MHz. However, it may happen that at the time of transmission the AP only needs to wake up WUR STA1, WUR STA4 and WUR STA5 and does not need to wake up WUR STA2 and WUR STA3. In such a case, since the AP does not need to transmit Wake-up signals on channels 1812 and 1814, it is proposed that a Null Signal 1824 be transmitted on channels 1812 and 1814 instead of the wake-up signals. The legacy 802.11 preamble and the BPSK Mark is transmitted on all four 20 MHz channels, the Wake-up signal for WUR STA1 1820 is transmitted on channel 1810 while the Wake-up signal for Group 4 1826 is transmitted on channel 1816. Since group addressed WUR frames are Variable Length (VL) WUR frames and may carry the frame body 250 shown in FIG. 2, the Wake-up Signal 1826 is likely to be longer than the individually addressed Wake-up signal 1820. As such the transmission on channel 1810 will end earlier and this may cause the energy level of the WUR portion of the WUR PPDU 1800 to drop. This is particularly risky since an idle Primary 20 MHz channel may give opportunity to another 802.11 to start transmitting a wide band PPDU before the end of transmission of the WUR PPDU 1800 thereby causing interference to the wake-up signals. To prevent this, the padding field 1822 is added to the end of the Wake-up Signal 1820 to align the transmission end time to the end of the WUR PPDU 1800. The padding field 1822 may be a series of all 1s, or all 0s or it may be a series of alternative 1s and 0s and is transmitted at the same data rate as the WUR-Data field of the Wake-up signal 1820. The L-SIG field in the legacy 802.11 preamble on all four 20 MHz channel signals the same PPDU length that covers the length of the WUR PPDU 1800.

The Null Signal 1824 may be constructed in a variety of ways as explain earlier in the context of FIG. 11, FIG. 13, FIG. 14 or FIG. 15. It is also possible that the Null Signal 1824 is not explicitly defined and the Null Signal is any form of transmission by the AP to create energy on the empty WUR channels. For example, the Null Signal 1824 may be a series of all 1s, or all 0s or it may be a series of alternative 1s and 0s or any other vendor specific signal that is transmitted at a similar transmit power as a valid Wake-up signal within the WUR PPDU 1800. Although not shown in FIG. 18, it is also possible that 1826 is the only valid Wake-up signal carried by the WUR PPDU 1800 and Null signal 1824 may also be transmitted on the Primary 20 MHz channel 1810 if the AP does not need to wake WUR STA1.

Sixth Embodiment

Figure 19:
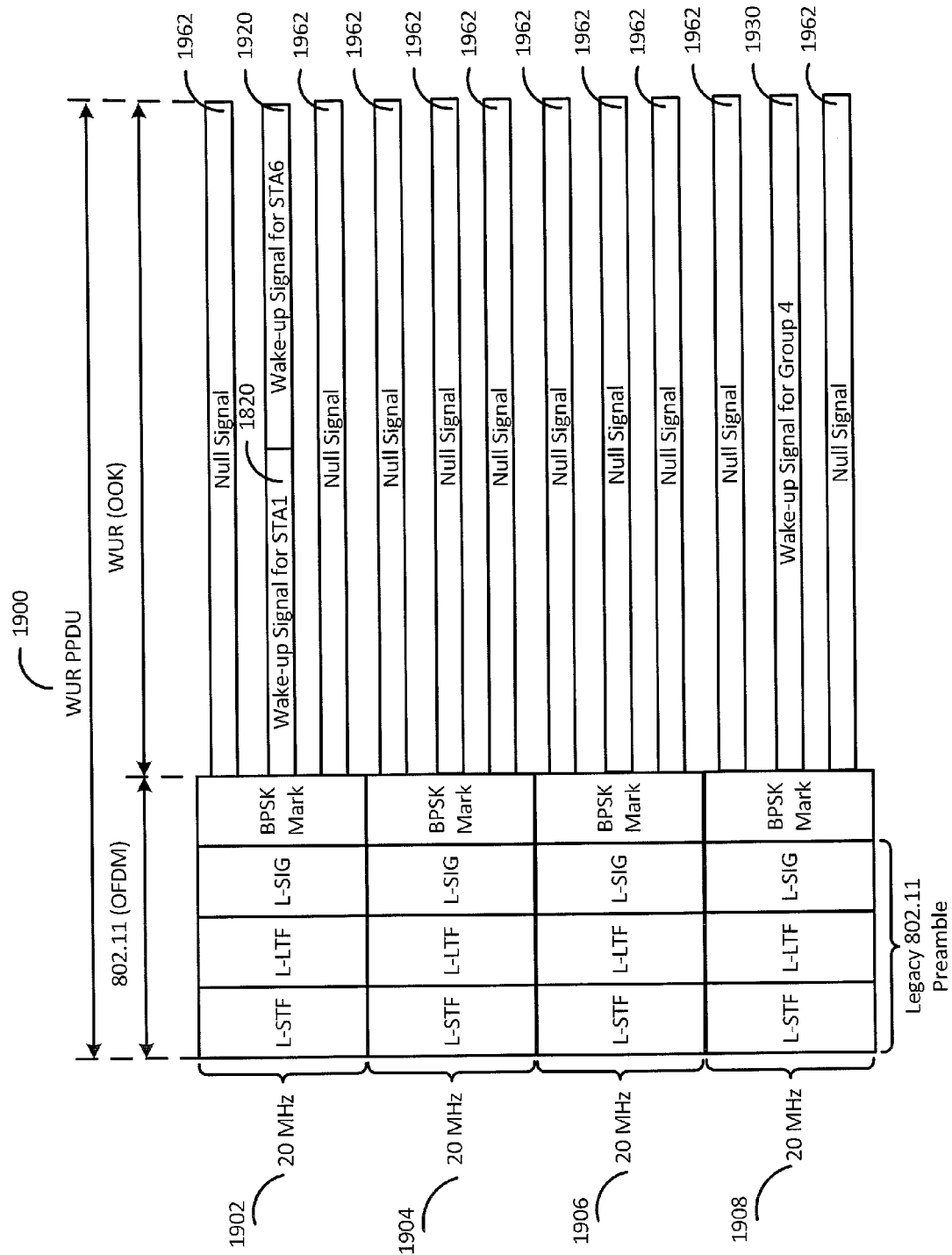
FIG. 19 shows alternative example schemes for transmission of a WUR PPDU as per a sixth embodiment when the number of WUR frames carried by the WUR PPDU is less than the number of available WUR channels.

In FIG. 10 a method of transmitting WUR PPDUs that reduce the risk of WUR Mid-packet CCA misdetection was proposed that involved defining some of the OFDM subcarriers on either side of the center 4 MHz WUR channel as Null Channel and transmitting Null Signals on them. Since the WUR Mid-packet CCA misdetection issue is also relevant when the Wide Band FDMA transmission is used, this method can be extended to the Wide Band FDMA transmission scheme as well. FIG. 19 shows an example where Null channels are defined in the 20 MHz channels 1902, 1904, 1906 and 1908 in a similar manner as the channel 1050 in FIG. 10. The same scenario occurs as explained in FIG. 18 except that WUR STA6 is also assigned on channel 1810. The AP only needs to transmit an individually addressed Wake-up signal 1820 to WUR STA1, an individually addressed Wake-up signal 1920 to WUR STA6 and a group addressed Wake-up signal for Group 4 1930. If the Wake-up signal for Group 4 1930 is sufficiently long enough, instead of adding padding to Wake-up signal 1820, it is also possible that the AP may concatenate the Wake-up signal 1920 to the Wake-up signal 1820. This helps to maintain the energy level of the WUR portion of WUR PPDU 1900 on channel 1902 while improving the WUR transmission efficiency at the same time. Although in FIG. 19, the concatenation is shown during FDMA, it is also possible that the concatenation happens when Code Domain multiplexing is used. When a high data rate Wake-up signal is multiplexed with a low data rate Wake-up signal, more than one high data rate Wake-up signals may be concatenated together if the low data rate WUR Signal is equal or longer than the concatenated length. In addition, in order to reduce the risk of WUR Mid-packet CCA misdetection issue, the AP also transmits the Null signal 1962 not only on the empty WUR channels at the center of channels 1902 and 1904 but also on all the Null channels in each of the 20 MHz channels. This will raise the energy level during the WUR portion of the WUR PPDU 1900, thereby raising the chance of the WUR PPDU 1900 being detected during other 802.11 devices' Clear Channel Assessment (CCA).

Seventh Embodiment

As also mentioned earlier, an AP is required to follow the IEEE 802.11 wideband channel access rules before transmitting a WUR PPDU using the Wide band FDMA scheme. As per the IEEE 802.11 wideband channel access rules, before transmitting a PPDU on a channel wider than 20 MHz, a STA is required to:

1. Perform the backoff procedure on the primary 20 MHz channel.

2. One PIFS prior to the intended transmit time, the secondary channels are checked for activity (−72 dBm mid-amble detection or −62 dBm ED). If at transmit time, the Primary 20 MHz channel is idle and there are no activities on any of the secondary channels, the wide band PPDU may be transmitted. However, if the Primary 20 MHz channel is idle but there are activities on the secondary channels, transmission is only allowed on the primary channel (primary 20, primary 40 or primary 80) on which there is no activity.

Figure 20:
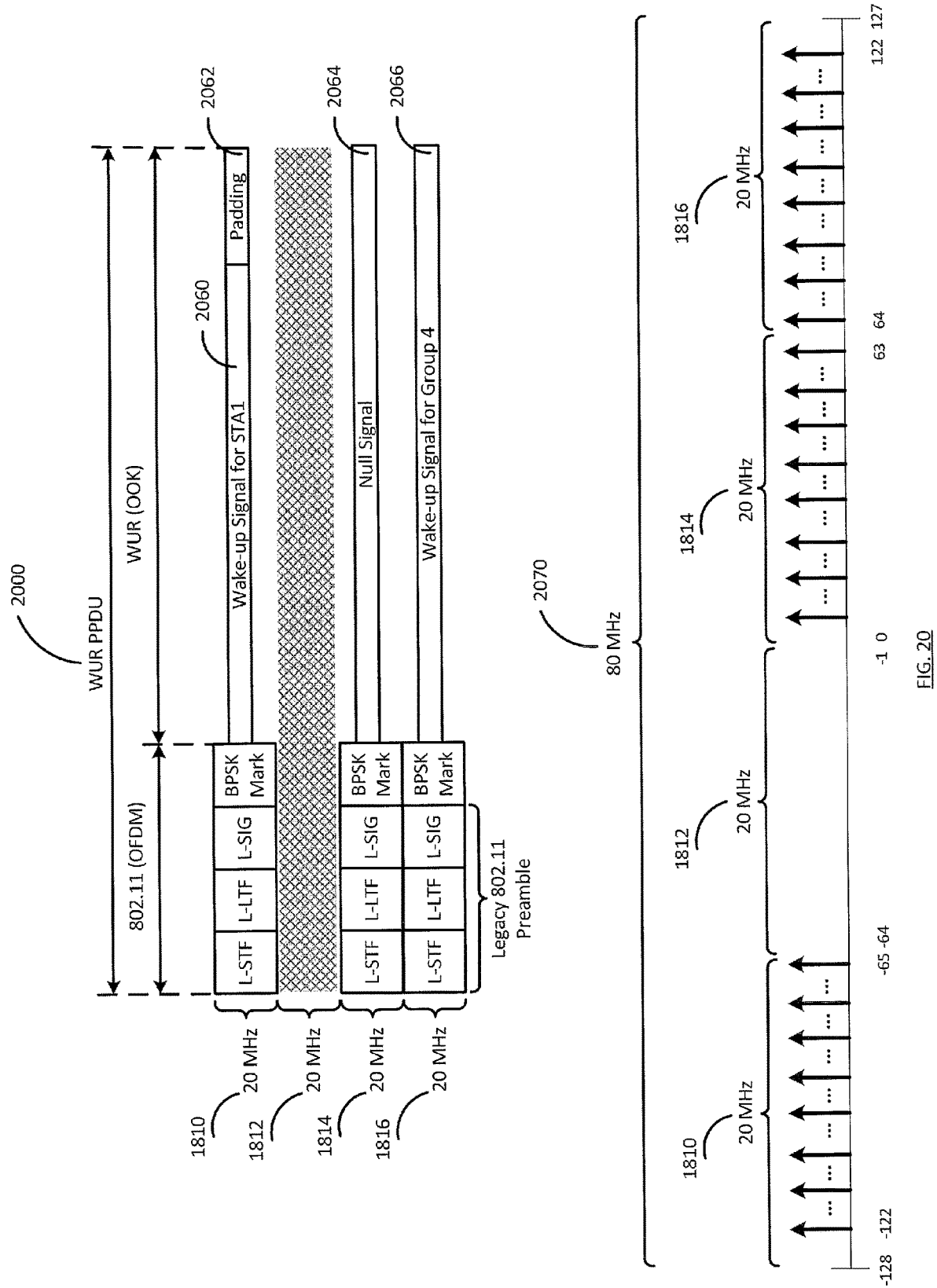
FIG. 20 shows example schemes for transmission of a WUR PPDU as per a seventh embodiment when transmission on some of the WUR channels is skipped.

Referring to FIG. 20, Channel 1810 is the primary 20 MHz channel of the BSS, channel 1812 is the secondary 20 MHz channel while channels 1814 and 1816 together make up the secondary 40 MHz channel. The assignment of channels to WUR STAs is the same as explained in FIG. 18. As per the IEEE 802.11 wideband channel access rules, if the AP needs to wake up either WUR STA4 or WUR STA5, since they are assigned to the secondary 40 MHz channel, the AP can transmit the Wake-up signal 2066 using the Wideband FDMA scheme only if the four 20 MHz channels 1810, 1812, 1814 and 1816 are all idle. Even if channel 1816 is idle but any one of the other three 20 MHz channels 1810, 1812 or 1814 is not idle, the AP is not able to transmit on channel 1816. For example, in FIG. 20 channel 1812 is detected to be busy (not idle) while the other three 20 MHz channels 1810, 1814 and 1816 are idle. The motive behind the IEEE 802.11 wideband channel access rules not allowing transmission on channel 1812 and consequently on channels 1814 and 1816 as well, is to prevent possible interference to any ongoing transmissions on channel 1812. This means that in order for the AP to wake WUR STAs assigned on the secondary 40 MHz, the entire 80 MHz has to be idle. Since the chances of the entire 80 MHz being idle is much lower compared to the chances of the Primary 20 being idle, AP should assign those WUR STAs that need to be frequently woken to the Primary 20.

The efficiency of the Wideband FDMA transmission may be improved if the IEEE 802.11 wideband channel access rule is changed to allow a modified version of the Wideband FDMA transmission scheme in which transmission on a busy secondary channel may be skipped but the legacy preamble, the BPSK mark as well as the Wake-up signal is allowed to be transmitted on the idle 20 MHz channels. The modified Wideband FDMA transmission scheme may be referred to as punctured Wideband FDMA transmission scheme and the skipped channel referred to as being punctured. An example WUR PPDU 2000 transmitted using the proposed punctured Wideband FDMA scheme is shown in FIG. 20. The assignment of channels to WUR STAs is the same as explained in FIG. 18. The AP only needs to transmit an individually addressed Wake-up signal 2060 to WUR STA1 and a group addressed Wake-up signal for Group 4 2066. The legacy 802.11 preamble and the BPSK Mark are transmitted on the three idle channels while transmission is skipped on the busy channel 1812. The Wake-up signal 2060 is transmitted on channel 1810 while the Wake-up signal 2066 is transmitted on channel 1816. Since group addressed WUR frames are longer than individually address WUR frames, padding 2062 is added to the end of Wake-up signal 2060. A Null Signal 2064 is transmitted on the empty WUR channel on channel 1814. Since nothing is transmitted on the busy secondary 20 MHz channel 1812, the punctured Wideband FDMA transmission scheme allows the AP to transmit on the Primary 20 MHz channel and the secondary 40 MHz channels 1814 and 1816 without causing interference to any ongoing transmissions on the busy channel 1812. Even though transmission is skipped on channel 1812, the WUR PPDU 2000 is transmitted using the 80 MHz waveform. An 80 MHz 802.11 channel 2070 consist of 256 OFDM subcarriers which are indexed from −128 to 127 with a subcarrier spacing of 312.5 KHz. The 256 subcarriers may be divided into four groups of 64 consecutive subcarriers, each group making up a 20 MHz channel. For example the subcarriers located at $\{-128, -65\}$ may make up channel 1810, the subcarriers located at $\{-64, -1\}$ may make up channel 1812, the subcarriers located at $\{0, 63\}$ may make up channel 1814, while the subcarriers located at $\{64, 127\}$ may make up channel 1816. The WUR PPDU 2000 may be transmitted using the modified version of the Wideband FDMA scheme by Nulling, i.e. not populating, the subcarriers located at $\{-64, -1\}$ that make up channel 1812. As for WUR STAs, the reception of Wake-up signals is transparent and the addressed WUR STAs need not be aware that the WUR PPDU 2000 was transmitted using the punctured Wideband FDMA scheme. Although the primary purpose of puncturing a 20 MHz channel is to avoid transmitting on a busy channel, it is up to the AP to decide which channels are to be punctured. In addition to the result of its own CCA, an AP may also make use of the knowledge of the channel conditions of WUR STAs to decide which channels are to be punctured. The AP may also choose to puncture the channels on which it is not required to transmit any Wake-up signals instead of transmitting a Null signal on it. For example, the AP may also puncture the channel 1814 in addition to channel 1812 when transmitting the WUR PPDU 2000. However, the primary 20 MHz channel is not allowed to be punctured. In the special situation where the AP does not need to transmit any Wake-up signal on the primary 20 MHz channel and only needs to transmit Wake-up signals on non-primary channels, the AP may transmit Null signal on the primary 20 MHz channel while it may puncture the channels on which it is not required to transmit any Wake-up signals. For example, if the AP is not required to wake WUR STA1, the AP may transmit the Null signal 2064 on channel 1810 and puncture the channels 1812 and 1814 when transmitting the WUR PPDU 2000.

Figure 21:
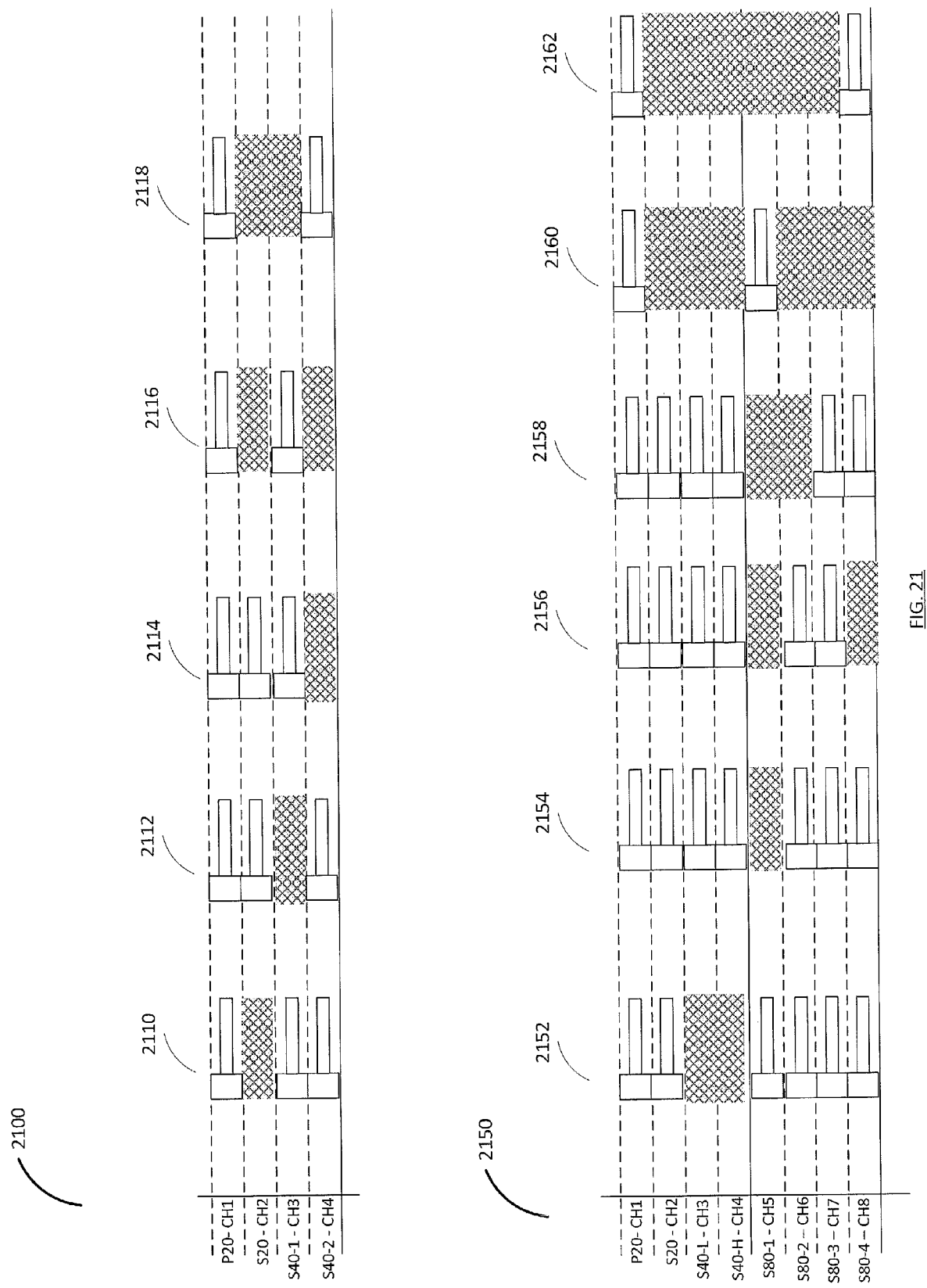
FIG. 21 shows examples of transmission of WUR PPDUs as per the seventh embodiment when transmission on some of the WUR channels is skipped.

FIG. 21 illustrates the various different possible configurations for the punctured Wideband FDMA transmission scheme with the grayed out regions representing the punctured channels. Here, P20 refers to the Primary 20 MHz, S20 refers to the Secondary 20 MHz, S40 refers to the Secondary 40 MHz and the suffixes 1 and 2 differentiates the first and second halves of the Secondary 40 MHz. Similarly S80 refers to the Secondary 80 MHz and the suffixes 1 to 4 differentiate the four 20 MHz channels within the Secondary 80 MHz. 2100 are the possible configurations for the 80 MHz WUR PPDUs transmitted using the punctured Wideband FDMA transmission scheme. The basic rule being that the Primary 20 MHz channel cannot be punctured and Wake-up signal must be transmitted on at least one 20 MHz channel within the Secondary 40 MHz. In the WUR PPDUs 2110, 2112 and 2114 a single 20 MHz channel is punctured, whereas in the WUR PPDUs 2116 and 2118, two 20 MHz channels are punctured.

While not meant to be exhaustive, 2150 are the representative configurations for the 160 MHz or the 80+80 MHz WUR PPDUs transmitted using the punctured Wideband FDMA transmission scheme. The basic rule here is that the Primary 20 MHz channel cannot be punctured and Wake-up signal must be transmitted on at least one 20 MHz channel within the Secondary 80 MHz. While the WUR PPDUs 2152, 2154, 2156 represent the more likely cases of only one or two 20 MHz channels being punctured, WUR PPDUs 2160 and 2162 represent the extreme case of only a single 20 MHz channel carrying Wake-up signal in each of the primary 80 MHz and the secondary 80 MHz. It can be seen that the punctured Wideband FDMA transmission scheme offers great flexibility to the AP when transmitting Wake-up signals to WUR STAs assigned on non-primary channels.

Figure 22:
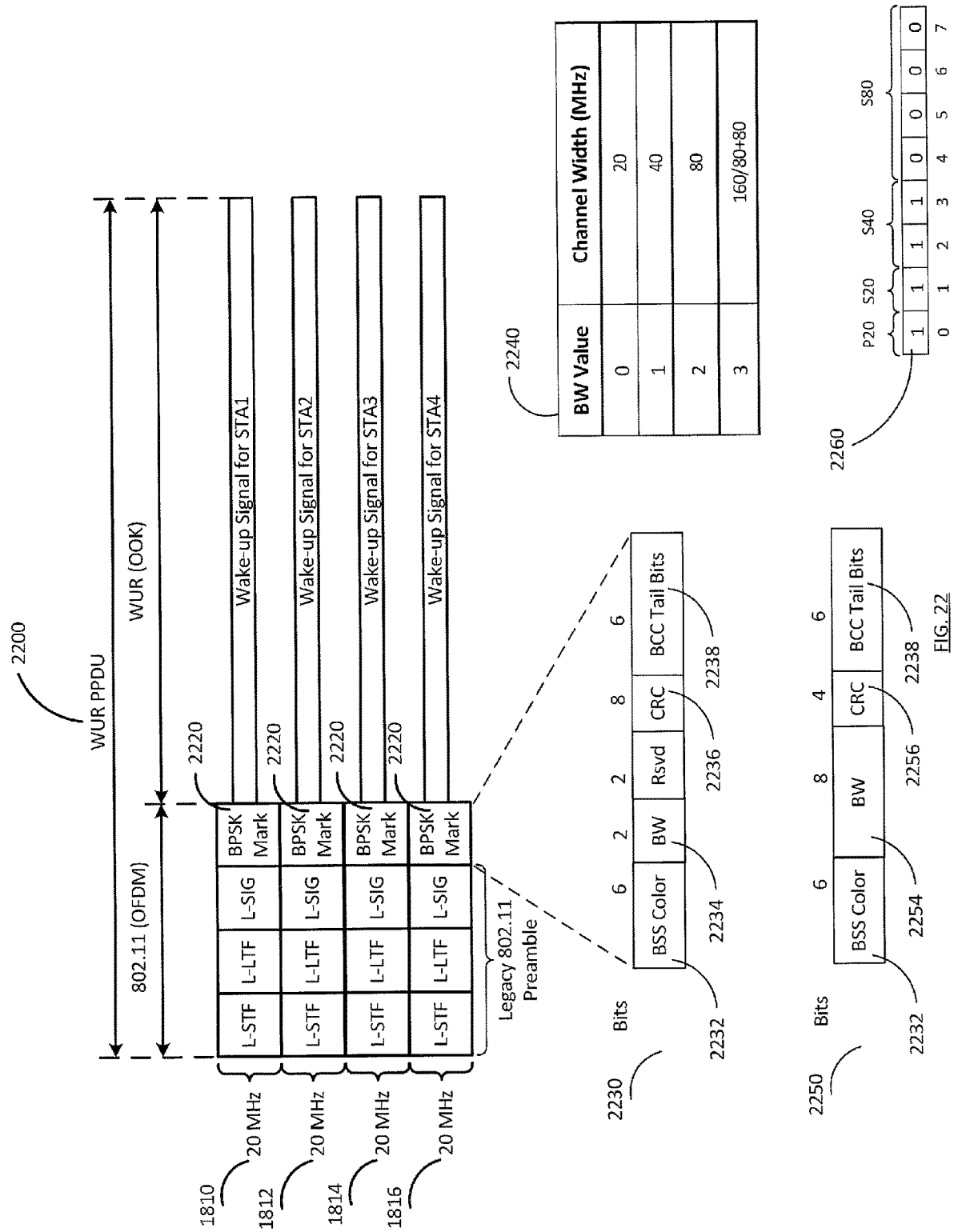
FIG. 22 shows alternative example scheme for transmission of broadcast WUR frames when multiple WUR operating channels are defined as per the seventh embodiment.

Although the reception of Wake-up signals carried in WUR PPDUs transmitted using the Wide band FDMA scheme is transparent to WUR STAs and the WUR STAs need not be aware of the bandwidth used for the WUR PPDU, it is helpful for other 802.11 devices in PCR mode to be aware of the bandwidth of the WUR PPDU. Since 802.11 devices predominantly listens for 802.11 preambles on the primary 20 MHz channel, the legacy 802.11 preamble of a WUR PPDU is more likely to be missed on non-primary 20 MHz channels and hence the WUR Mid-packet CCA misdetection issue is more likely to occur on the non-primary 20 MHz channels. A method of signaling the bandwidth of a WUR PPDU 2200 transmitted using the Wide band FDMA scheme is shown in FIG. 22. Although the primary purpose of the BPSK Mark 2220 is to prevent 802.11n devices from wrongly decoding the WUR packet 2200 as being an 802.11n packet, it may also be used to signal the bandwidth of a WUR PPDU 2200. The BPSK Mark 2220 is BCC (Binary Convolution Code) encoded using rate ½ convolution encoder as specified in the IEEE 802.11 specification and can carry 24 information bits. Two potential formats of the BPSK Mark are shown in FIG. 22. A potential format 2230 of the BPSK Mark 2220 splits it into four fields: a 6 bits BSS Color 2232 representing the BSS, a 2 bits BW field 2234 indicating the bandwidth of the WUR PPDU 2200, an 8 bits CRC field 2236 and a 6 bits BCC tail bits field 2238. The encoding of the BW field 2234 is shown in table 2240 with values 0, 1, 2 and 3 representing a 20 MHz, 40 MHz, 80 MHz and 160 MHz/80+80 MHz WUR PPDU respectively. An alternative format 2250 of the BPSK Mark 2220 is also possible using an 8 bits BW field 2254 and a 4 bits CRC field 2256. The BW field 2254 carries an 8 bits bitmap 2260, each bit representing the state of a 20 MHz channel within a WUR PPDU's bandwidth. A bit set to 1 represents a 20 MHz channel carrying information while a bit set to 0 represents either a punctured 20 MHz channel or a 20 MHz channel is not part of the WUR PPDU.

Figure 23:
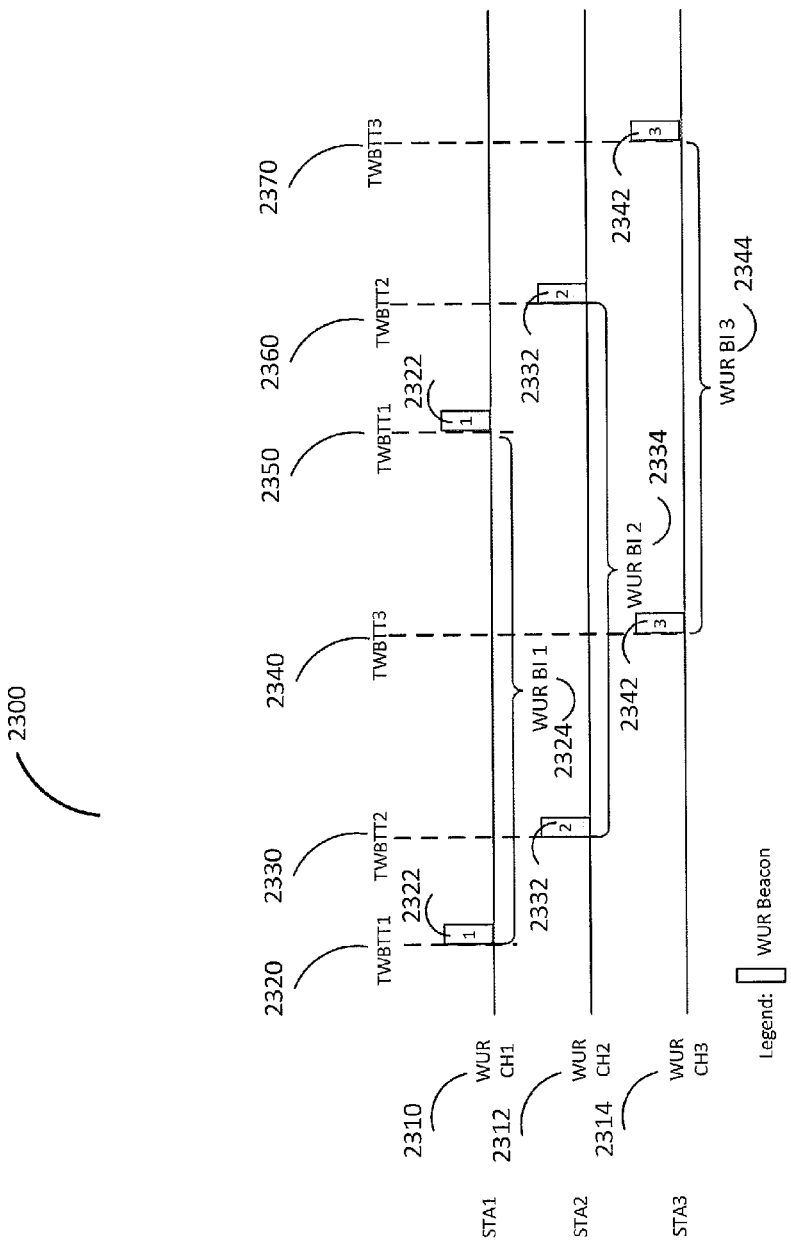
FIG. 23 shows the signaling of the WUR PPDU bandwidth when FDMA transmission is used as per the seventh embodiment.

As mentioned earlier, when multiple WUR channels are in operation within a BSS, WUR STAs may be assigned to different WUR channels. Since a WUR STA only listens to its assigned WUR channel while it is in WUR mode, the WUR STA may not receive broadcast WUR frames transmitted by the AP on other WUR channels. Simultaneous transmission of broadcast WUR frames on multiple WUR channels using FDMA scheme is one potential solution as described in FIG. 17. However, FDMA transmission may not be possible in some scenario, for example when the WUR channels are not adjacent to each other, or when AP or WUR STAs do not have FDMA capabilities etc. An alternative solution 2300 is shown in FIG. 23 in which the broadcast WUR frames are transmitted on all the WUR channels independently. Three WUR STAS, WUR STA1, WUR STA2 and WUR STA3 are assigned to WUR CH1 2310, WUR CH2 2312 and WUR CH3 2314 respectively. Taking the special case of WUR Beacons, instead of using a single WUR Beacon for the whole BSS, an AP may allocate an independent WUR Beacon for each WUR channel. The transmission times and periodicity of each WUR Beacon may be customized to fit the need of the WUR STAs on each WUR Channel and the AP may use the WUR Beacon Period 534 and TWBTT Offset 536 of a particular WUR Operating Channels set in the WUR Operation element 500 in FIG. 5A to advertise the parameters of the WUR Beacons on each WUR channel. The partial TSF carried in the WUR Beacons may also have different resolutions for different WUR channels. The WUR Beacon 2322 is transmitted on WUR CH1 2310 at TWBTT 2320, TWBTT 2350 and so on with a periodicity of WUR BI 1 2324, the WUR Beacon 2332 is transmitted on WUR CH2 2312 at TWBTT 2330, TWBTT 2360 and so on with a periodicity of WUR BI 2 2334 and the WUR Beacon 2342 is transmitted on WUR CH3 2314 at TWBTT 2340, TWBTT 2370 and so on with a periodicity of WUR BI 3 2344. The AP may customize the WUR Beacon Periods WUR BI 1 2324, WUR BI 2 2334 and WUR BI 3 2344 according to the synchronization needs of the WUR STAs assigned to the different WUR channels. For example the WUR Beacon period may be short (e.g. 0.5 s) for WUR STAs that require very tight clock synchronization with the AP. The partial TSF carried in the WUR Beacons may also have higher resolution (e.g. 2 µs) in such case. Similarly, the WUR Beacon period for WUR STAs that do not require very tight clock synchronization with the AP may be relatively longer (e.g. 1 s). The partial TSF carried in the WUR Beacons may also have lower resolution (e.g. 8 μs) in such case.

Configuration of an Access Point

Figure 24:
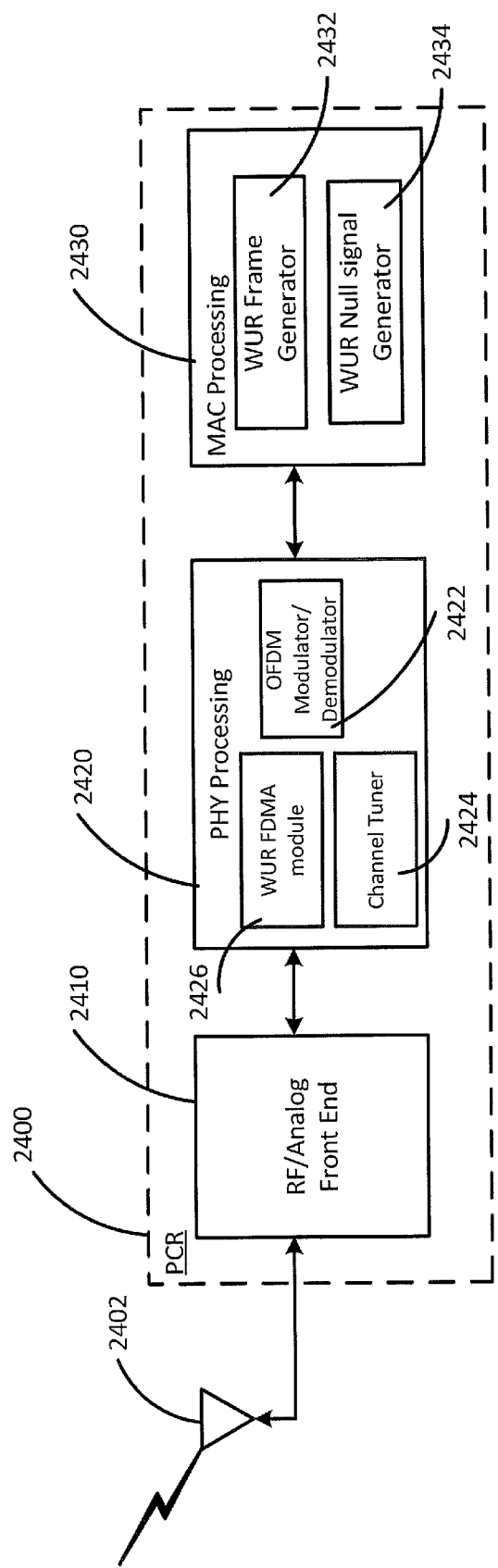
FIG. 24 is a simplified block diagram of an example AP that implements the disclosed transmission scheme.

FIG. 24 is a block diagram of the PCR 2400 of an example AP that implements the transmission schemes described in the present disclosure. The AP may be the AP 110 in FIG. 1 (The PCR 2400 may be the PCR 112 in FIG. 1). The PCR 2400 is connected to the antenna 2402, and is used for the transmission and reception of 802.11 signals as well as for the transmission of WUR PPDUs. PCR 2400 is comprised of an RF/Analog front end 2410, PHY processing circuitry 2420 and MAC processing circuitry 2430.

The RF/Analog front end 2410 is responsible for transfer of analog signals to/from the antenna 2402 and may comprise sub-components such as Automatic Gain Control (AGC), Low Pass Filter (LPF), Analog-to-Digital Converter (ADC) and so on.

The PHY Processing circuitry 2420 is responsible for the processing of the PHY layer signals and is further comprised of an OFDM modulator/demodulator 2422, a Channel Tuner 2424 and a WUR FDMA module 2426. The OFDM modulator/demodulator 2422 is responsible for the OFDM modulation of transmit signals or demodulation of received OFDM signals. On the transmission side, aside from applying OFDM modulation to 802.11 PPDUs, the OFDM modulator/demodulator 2422 is also used to generate WUR signal (e.g. OOK) by populating selected OFDM subcarriers. The Channel Tuner 2424 is used to set the transmission frequency to the correct channel for transmissions or reception, for example to the PCR channel for transmission or reception of PCR signals, or to the correct WUR Operational Channel for transmission of WUR PPDUS. The WUR FDMA module 2426 is present if the AP is capable of FDMA transmissions and is used for multiplexing of WUR signals when FDMA transmission is used.

The MAC Processing circuitry 2430 is responsible for various MAC related processing such as retransmission, fragmentation, aggregation etcetera and is further comprised of a WUR Frame Generator 2432 and a WUR Null signal Generator 2434. The WUR Frame Generator 2432 is responsible for generating the WUR Frames carried in WUR PPDUs transmitted by the AP and to schedule them for transmission at the correct time. The WUR Null signal Generator 2434 is responsible for generating the Null signals that is transmitted instead of WUR Frames on WUR channels as well as the Null signals transmitted on Null channels.

Figure 25:
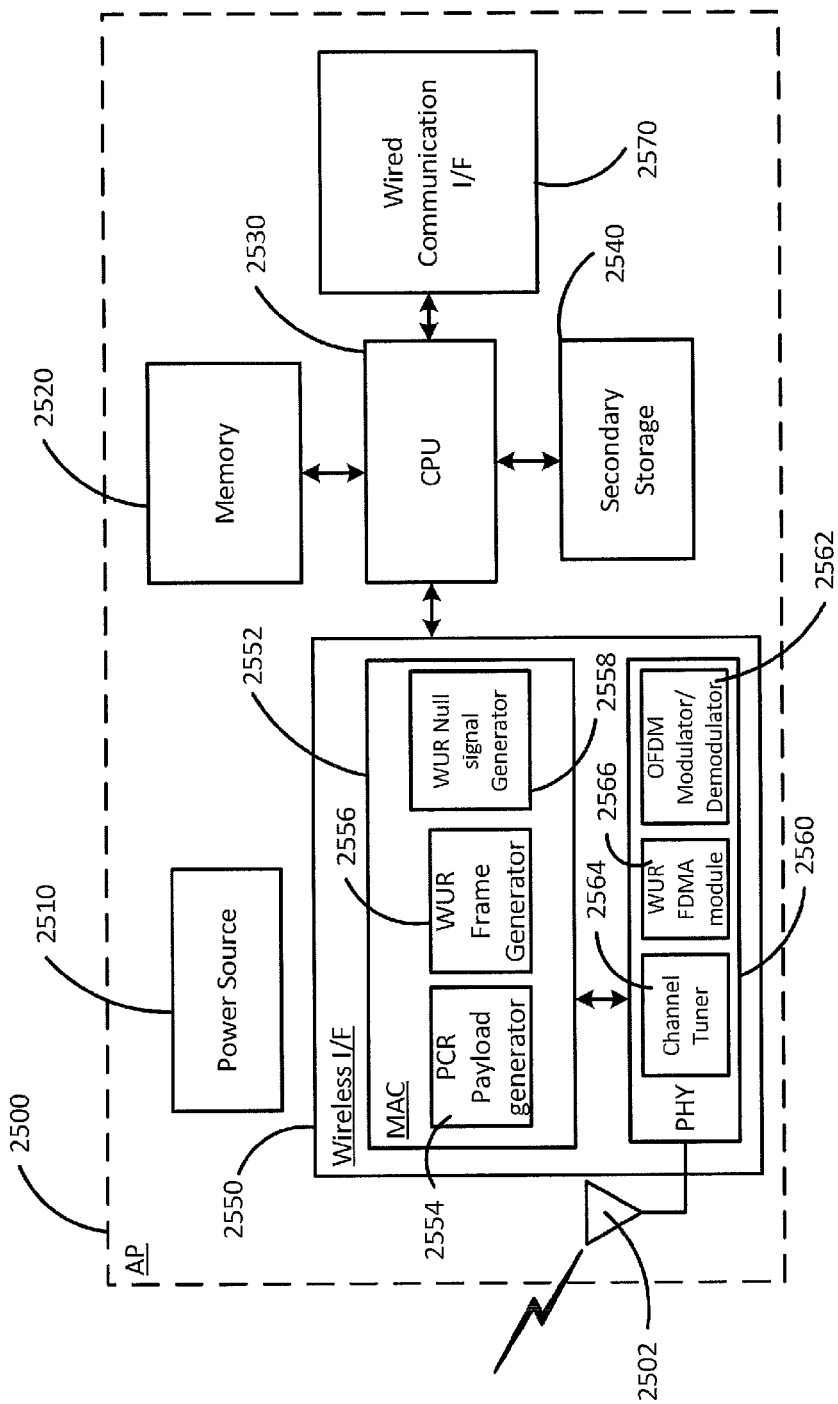
FIG. 25 is a detailed block diagram of an example AP that implements the disclosed transmission scheme.

FIG. 25 is a more detailed block diagram of an example AP 2500, which may be the AP 110 in FIG. 1. The AP 2500 comprises a Central Processing Unit (CPU) 2530 coupled to a memory 2520, a secondary storage 2540, one or more wireless interfaces 2550, as well as other wired communication interfaces 2570. The secondary storage 2540 may be a non-volatile computer readable storage medium that is used to permanently store pertinent instruction codes, data etc.

At the time of startup, the CPU 2530 may copy the instruction codes as well as related data to the volatile memory 2520 for execution. The instruction code may be an operating system, user applications, device drivers, execution codes etc. which are required for the operation of the AP 2500. The size of the instruction code and hence the storage capacity of both the secondary storage 2540 as well as the memory 2520 may be substantially bigger than that of the STA 2700 in FIG. 27.

The AP 2500 may also comprise a power source 2510 which in most cases may be a power mains but in some cases may also be some kind of high capacity battery for e.g. a car battery. The wired communication interface 2570 may be an ethernet interface, or a powerline interface, or a telephone line interface etc.

The wireless interface 2550 may comprise an interface for cellular communication, or an interface for short range communication protocols such as Zigbee, or it may be a WLAN interface. The wireless interface 2550 may further comprise a MAC module 2552 and a PHY module 2560. The MAC module 2552 of an AP may be substantially more complicated than that of a STA 2700 in FIG. 27 and may comprise many sub-modules. Among other sub-modules, the MAC module 2552 may be comprised of a WUR Frame Generator 2556, a PCR payload generator 2554 and a WUR Null Signal Generator 2258. The PHY module 2560 is responsible for the conversion of the MAC module data to/from the transmission/reception signals and is further comprised of an OFDM modulator/demodulator 2562, a Channel Tuner 2564 and a WUR FDMA module 2566. The wireless interface may also be coupled, via the PHY module, to one or more antennas 2502 that are responsible for the actual transmission/reception of the wireless communication signals on/from the wireless medium.

An AP as per the present disclosure may comprise many other components that are not illustrated, for sake of clarity, in FIG. 24 and FIG. 25. Only those components that are most pertinent to the present disclosure are illustrated.

Configuration of a STA

Figure 26:
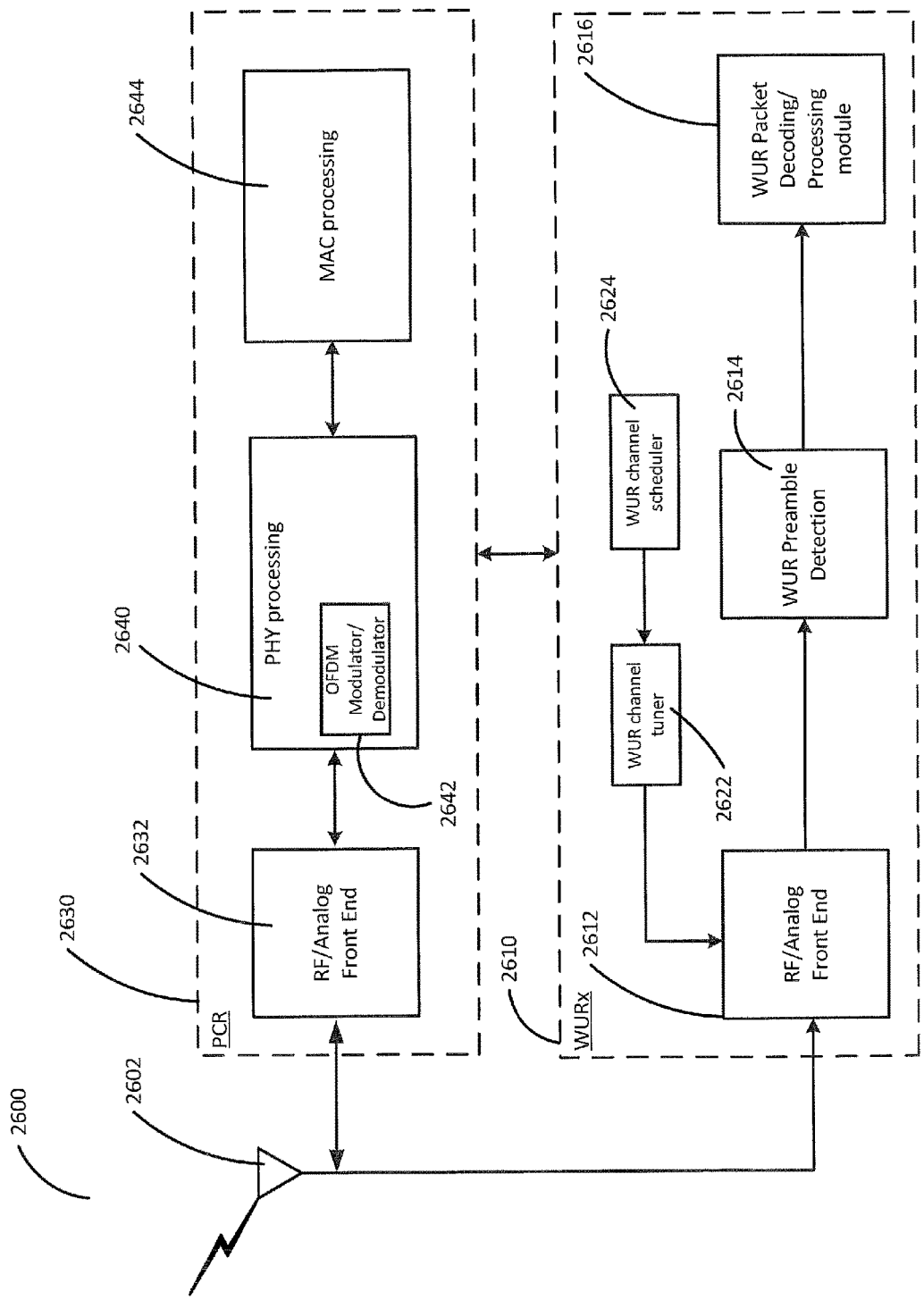
FIG. 26 is a simplified block diagram of an example WUR STA that implements the disclosed transmission scheme.

FIG. 26 illustrates a WUR STA 2600 that is equipped with two separate radios: a PCR 2630 for transmitting and receiving 802.11 OFDM signals and a WURx 2610 for receiving WUR PPDUs.

The WURx 2610 is further comprised of several sub components such as an RF/Analog Front End 2612 responsible for receiving the analog radio signals from the antenna 2602, a WUR Preamble Detection module 2614 responsible for detecting and decoding the preamble portion of the WUR PPDUs, a WUR Packet Decoding/Processing module 2616 responsible for decoding and processing the payload portion of the wakeup signal, a WUR channel tuner 2622 responsible for tuning the WURx to the correct WUR channel and a WUR channel scheduler 2624 which is responsible for correctly scheduling the WUR channel tuner 2622 for reception of broadcast WUR frames.

The PCR 2630 is comprised of an RF/Analog front end 2632, a PHY processing circuitry 2640 and a MAC processing circuitry 2644. The RF/Analog front end 2632 is responsible for transfer of analog signals to/from the antenna 2602 and may comprise sub-components such as Automatic Gain Control (AGC), Low Pass Filter (LPF), Analog-to-Digital Converter (ADC) and so on. The PHY Processing circuitry 2640 is responsible for the processing of the PHY layer signals and is further comprised of an OFDM modulator/demodulator 2642 that is responsible for the modulation of transmit OFDM signals or demodulation of received OFDM signals.

Figure 27:
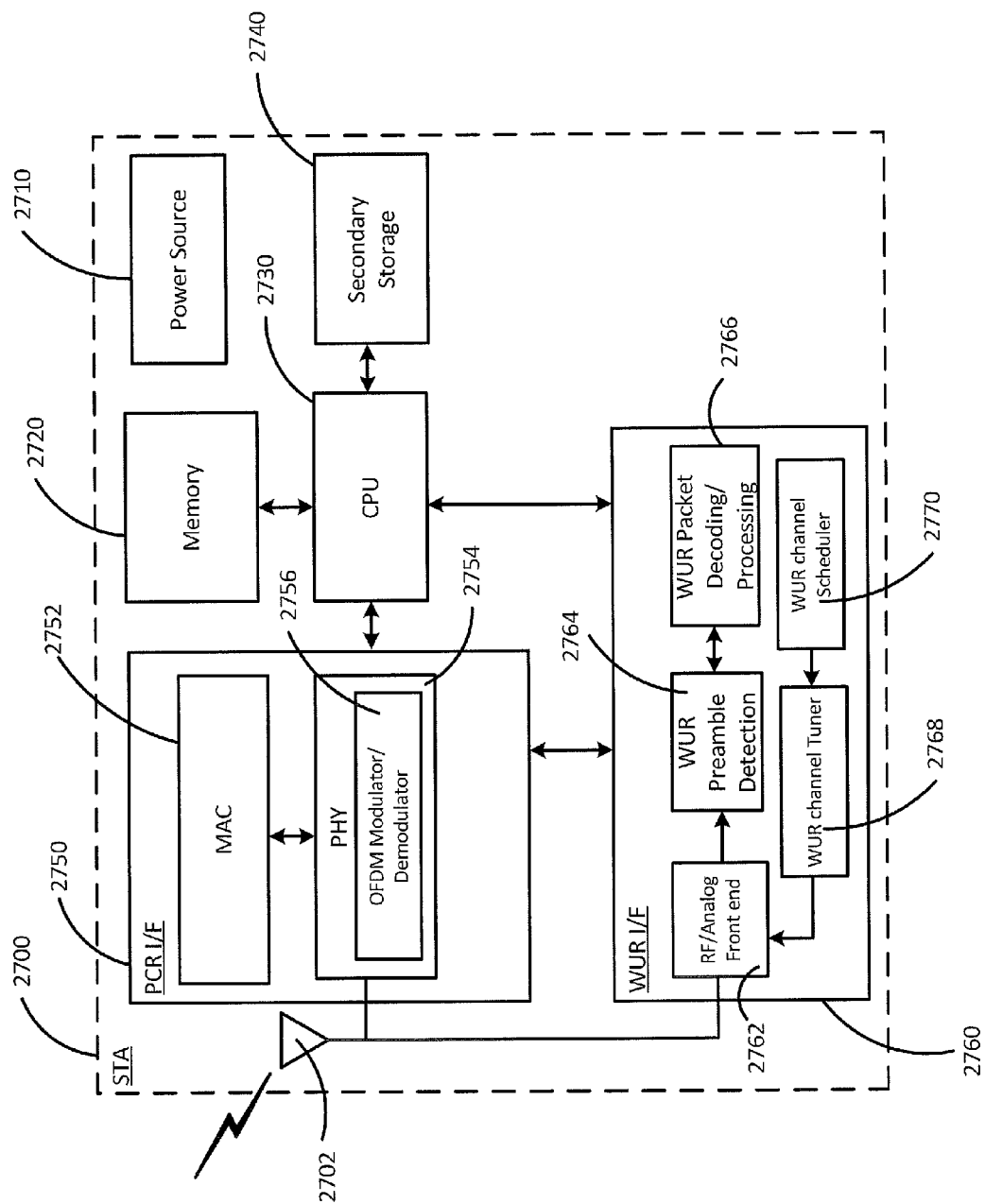
FIG. 27 is a detailed block diagram of an example WUR STA that implements the disclosed transmission scheme.

FIG. 27 is a detailed block diagram of an example STA 2700 that may be any of WUR STA 130, WUR STA 140, WUR STA 150 or WUR STA 160 in FIG. 1. The STA 2700 is comprised of a Central Processing Unit (CPU) 2730 coupled to a memory 2720, a secondary storage 2740, a PCR interfaces 2750 as well a WUR interface 2760. Both the PCR interface 2750 and the WUR interface 2760 are connected to the same wireless antenna 2702. The secondary storage 2740 may be a non-volatile computer readable storage medium that is used to permanently store pertinent instruction codes, data etc.

At the time of startup, the CPU 2730 may copy the instruction codes as well as related data to the volatile memory 2720 for execution. The instruction code may be an operating system, user applications, device drivers, execution codes etc. which are required for the operation of the STA 2700. The STA 2700 may also comprise a power source 2710, for example a lithium ion battery or a coin cell battery etc. or it may also be Mains electricity. The PCR interface 2750 may comprise an interface for cellular communication, or an interface for short range communication protocols such as Zigbee, or it may be a WLAN interface.

The PCR interface 2750 is comprised of a MAC module 2752 and a PHY module 2754 which is further comprised of an OFDM Modulator/Demodulator 2756.

The WUR interface 2760 is comprised of several sub components such as an RF/Analog Front End 2762 responsible for receiving the analog radio signals from the antenna 2702, a WUR Preamble Detection module 2764 responsible for detecting and decoding the preamble portion of the wake up signal, a WUR Packet Decoding/Processing module 2766 responsible for decoding and processing the payload portion of the wakeup signal, a WUR channel tuner 2768 responsible for tuning the WUR interface to the correct WUR channel and a WUR channel scheduler 2770 which is responsible for correctly scheduling the WUR channel tuner 2768 for reception of broadcast WUR frames.

A STA as per the present disclosure may comprise many other components that are not illustrated, for sake of clarity, in FIG. 26 or FIG. 27. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

The present disclosure can be realized by any kind of apparatus, device or system having a function of communication, which is referred as a communication apparatus. Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosure of U.S. Provisional Application No. 62/616,274, filed on Jan. 11, 2018 and Japanese Patent Application No. 2018-084417, filed on Apr. 25, 2018, including the specification, drawings and abstract, is incorporated herein by reference in its entirety.

INDUSTRIAL APPLICABILITY

This disclosure can be applied to a wireless apparatus to achieve a faster roaming to another wireless network or to cut down the scan latency during an initial link setup.

REFERENCE SIGNS LIST 110, 2500 AP
120 STA
130, 140, 150, 160, 2600, 2700 WUR STA
112, 122, 132, 142,152, 162, 2400, 2630, 2750 PCR
134, 144, 154, 164, 2610, 2760 WURx
2402, 2502, 2602, 2702 Antenna
2410, 2612, 2632, 2762 RF/Analog Front End
2420, 2560, 2640, 2754 PHY processing circuitry
2422, 2562, 2642, 2756 OFDM Modulator/Demodulator
2622, 2768 WUR channel tuner
2624, 2770 WUR channel scheduler
2432, 2556 WUR Frame Generator
2424, 2564 Channel Tuner
2430, 2552, 2644, 2752 MAC processing circuitry
2554 PCR Payload Generator
2510, 2710 Power Source
2520, 2720 Memory 2530, 2730 CPU
2540, 2740 Secondary Storage
2550 Wireless I/F
2570 Wired Communication I/F
2614, 2764 WUR Preamble Detection
2616, 2766 WUR Packet Decoding/Processing module

The invention claimed is:

1. A communication apparatus, comprising:
control circuitry, and a receiver which is coupled to the control circuitry,
wherein the control circuitry negotiates with an Access Point (AP) a Wake-up radio (WUR) primary channel and a WUR channel by controlling the receiver to receive, from the AP:
a WUR operation element that indicates the WUR primary channel used by the AP for transmission of a first WUR PHY Protocol Data Unit (PPDU) including a WUR Beacon frame; and
a WUR Mode element that indicates the WUR channel used by the AP for transmission of a second WUR PPDU including a WUR Wake-up frame, wherein the WUR primary channel is a different type of channel than the WUR channel, and a frequency domain of the WUR primary channel does not overlap with a frequency domain of the WUR channel, and
wherein, based on the negotiated WUR primary channel and the WUR channel, the control circuitry controls the receiver to receive:
the second WUR PPDU including the WUR Wake-up frame on the WUR channel; and
the first WUR PPDU including the WUR Beacon frame on the WUR primary channel according to a target WUR Beacon transmission time (TWBTT).

2. The communication apparatus of claim 1, wherein the WUR operation element includes a WUR operating class field and a WUR channel field that together indicate the WUR primary channel.

3. The communication apparatus of claim 1, wherein the WUR operation element is included in at least one of a beacon frame and a probe response frame.

4. The communication apparatus of claim 1, wherein the WUR mode element includes a WUR operating class field and a WUR channel field that together indicate the WUR channel.

5. The communication apparatus of claim 1, wherein, after receiving the first WUR PPDU including the WUR Beacon frame or in response to the first WUR PPDU including the WUR Beacon frame not being received within a determined time, the control circuitry, in operation, performs scanning of the WUR channel.

6. The communication apparatus of claim 1, wherein the receiver, in operation, does not receive the first WUR PPDU including the WUR Beacon frame on the WUR channel, and does not receive the second WUR PPDU including the WUR Wake-up frame on the WUR primary channel.

7. An access point (AP), comprising:
circuitry which, in operation, negotiates with a communication apparatus a Wake-up radio (WUR) primary channel and a WUR channel by generating a Wake-up radio (WUR) operation element that indicates the WUR primary channel used for transmission of a first WUR PHY Protocol Data Unit (PPDU) including a WUR Beacon frame, and by generating a WUR Mode element that indicates the WUR channel used for transmission of a second WUR PPDU including a WUR Wake-up frame, wherein the WUR primary channel is a different type of channel than the WUR channel, and a frequency domain of the WUR primary channel does not overlap with a frequency domain of the WUR channel; and
a transmitter, which is coupled to the circuitry and which, in operation, transmits a first frame that includes the WUR operation element and a second frame that includes the WUR Mode element, and transmits, based on the negotiated WUR primary channel and the WUR channel, the second WUR PPDU including the WUR Wake-up frame on the WUR channel, and the first WUR PPDU including the WUR Beacon frame on the WUR primary channel according to a target WUR Beacon transmission time (TWBTT).

8. The access point of claim 7, wherein the WUR operation element includes a WUR operation class field and a WUR channel field that together indicate the WUR primary channel.

9. The access point of claim 7, wherein the WUR operation element is included in at least one of a beacon frame and a probe response frame.

10. The access point of claim 7, wherein the second WUR PPDU is a WUR Frequency Division Multiple Access (FDMA) PHY Protocol Data Unit (PPDU) including the WUR Wake-up frame, wherein the WUR FDMA PPDU is one of a 40 MHz WUR FDMA PPDU, an 80 MHz WUR FDMA PPDU, or an 80 MHz preamble punctured WUR FDMA PPDU.

11. The access point of claim 10, wherein the WUR FDMA PPDU carries, on the WUR channel, the first frame addressed to a communication apparatus and carries, on the WUR primary channel, a null signal.

12. The access point of claim 11, wherein the null signal is a WUR frame.

13. The access point of claim 11, wherein the null signal is padding.

14. The access point of claim 10, wherein the WUR FDMA PPDU carries a broadcast WUR frame both on the WUR primary channel and on the WUR channel.

15. The access point of claim 10, wherein during transmission of the 80 MHz preamble punctured WUR FDMA PPDU, if the WUR channel is not idle or the access point does not have a pending WUR frame intended for a communication apparatus listening on the WUR channel, nothing is transmitted on the WUR channel.

16. The access point of claim 10, wherein the transmitter transmits the WUR FDMA PPDU including the WUR Wake-up frame on a wide-band channel that includes the WUR primary channel and the WUR channel.

17. The access point of claim 7, wherein the circuitry, in operation, assigns the WUR channel to a communication apparatus, and the transmitter, in operation, does not transmit, to the communication apparatus, the first WUR PPDU including the WUR Beacon frame on the assigned WUR channel, and does not transmit the second WUR PPDU including the WUR Wake-up frame to the communication apparatus on the WUR primary channel.

18. A communication method, comprising:
negotiating with an Access Point (AP) a Wake-up radio (WUR) primary channel and a WUR channel by receiving, from the AP, a WUR operation element that indicates the WUR primary channel used by the AP for transmission of a first WUR PHY Protocol Data Unit (PPDU) including a WUR Beacon frame, and a WUR Mode element that indicates the WUR channel used by the AP for transmission of a second WUR PPDU including a WUR Wake-up frame, wherein the WUR primary channel is a different type of channel than the WUR channel, and a frequency domain of the WUR primary channel does not overlap with a frequency domain of WUR channel;

receiving, based on the WUR channel, the WUR Wake-up frame on the WUR channel; and controlling, based on the negotiated WUR primary channel, reception, from the AP, of the first WUR PPDU including the WUR Beacon frame on the WUR primary channel according to a target WUR Beacon transmission time (TWBTT).

\* \* \* \* \*